US010785155B2

(12) United States Patent
Damola et al.

(10) Patent No.: US 10,785,155 B2
(45) Date of Patent: Sep. 22, 2020

(54) DEVICES AND METHODS USING NETWORK LOAD DATA IN MOBILE CLOUD ACCELERATOR CONTEXT TO OPTIMIZE NETWORK USAGE BY SELECTIVELY DEFERRING CONTENT DELIVERY

(75) Inventors: Ayodele Damola, Solna (SE); Krister Svanbro, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 829 days.

(21) Appl. No.: 14/356,926

(22) PCT Filed: Mar. 20, 2012

(86) PCT No.: PCT/IB2012/051335
§ 371 (c)(1),
(2), (4) Date: May 8, 2014

(87) PCT Pub. No.: WO2013/093653
PCT Pub. Date: Jun. 27, 2013

(65) Prior Publication Data
US 2014/0310426 A1 Oct. 16, 2014

Related U.S. Application Data

(60) Provisional application No. 61/578,460, filed on Dec. 21, 2011, provisional application No. 61/578,840, filed on Dec. 21, 2011.

(51) Int. Cl.
*H04L 12/801* (2013.01)
*H04L 12/14* (2006.01)
(Continued)

(52) U.S. Cl.
CPC .......... *H04L 47/12* (2013.01); *H04L 12/1489* (2013.01); *H04L 29/08729* (2013.01);
(Continued)

(58) Field of Classification Search
CPC .............................. H04L 67/325; G06Q 20/10
(Continued)

(56) References Cited

U.S. PATENT DOCUMENTS 6,341,304 B1 * 1/2002 Engbersen ........ G06F 17/30902
707/E17.12
2004/0180677 A1 9/2004 Harris et al.
(Continued)

FOREIGN PATENT DOCUMENTS

EP 2 381 643 A1 10/2011

OTHER PUBLICATIONS

International Search Report issued in corresponding International application No. PCT/IB2012/051335, dated Nov. 7, 2012.
(Continued)

*Primary Examiner* — Meng Vang
(74) *Attorney, Agent, or Firm* — Patent Portfolio Builders PLLC

(57) ABSTRACT

Network devices, servers, and modules operating within MCA capable to selectively defer delivery of non-time sensitive content are provided. A network device (315) includes a communication interface (410) configured to enable communication with a client device (310), and to receive a request for a content delivery from the client device (310). The network device also includes a processing unit (420) configured to determine whether to defer the request depending on a network load at a time when the request has been received.

22 Claims, 19 Drawing Sheets

(51) Int. Cl.
   *H04L 29/08*   (2006.01)
   *H04L 29/12*   (2006.01)
   *H04M 15/00*   (2006.01)
   *H04L 29/06*   (2006.01)

(52) U.S. Cl.
   CPC ........ *H04L 61/1511* (2013.01); *H04L 67/325* (2013.01); *H04L 67/42* (2013.01); *H04M 15/80* (2013.01); *H04M 15/8027* (2013.01); *H04M 15/81* (2013.01)

(58) Field of Classification Search
   USPC .......................................................... 709/206
   See application file for complete search history.

(56) References Cited

U.S. PATENT DOCUMENTS

| | | | | |
|---|---|---|---|---|
| 2006/0141962 | A1* | 6/2006 | Forbes | H04H 20/93 455/186.1 |
| 2007/0260673 | A1* | 11/2007 | Shenfield | G06F 17/30864 709/203 |
| 2008/0155059 | A1* | 6/2008 | Hardin | H04N 7/17336 709/218 |
| 2008/0192820 | A1* | 8/2008 | Brooks | H04N 7/17318 375/240.02 |
| 2008/0285936 | A1* | 11/2008 | Yampanis | H04N 7/17327 386/248 |
| 2008/0320530 | A1* | 12/2008 | Weaver | H04N 7/17336 725/87 |
| 2010/0057872 | A1 | 3/2010 | Koons et al. | |
| 2011/0029596 | A1* | 2/2011 | Spatscheck | H04L 67/1002 709/203 |
| 2011/0055413 | A1 | 3/2011 | Lobsenz | |
| 2011/0082924 | A1 | 4/2011 | Gopalakrishnan | |
| 2012/0064908 | A1* | 3/2012 | Fox | H04W 28/10 455/452.2 |
| 2013/0031279 | A1* | 1/2013 | Venugopal | H04L 12/1435 710/18 |

OTHER PUBLICATIONS

International Preliminary Report on Patentability issued in corresponding International application No. PCT/IB2012/051335, dated Jul. 3, 2014.

Search Report in corresponding Chinese Application No. 201280063415.2 dated Aug. 24, 2016. (All references previously submitted in an Information Disclosure Statement dated May 8, 2014 including CN 1759542 A also published as US 2004/0180677.).

First Office Action in corresponding Chinese Application No. 201280063415.2 dated Sep. 1, 2016. (Reference D1 was previously submitted in an Information Disclosure Statement dated May 8, 2014.)

Office Action in corresponding Chinese Application No. 201200634152 dated Sep. 22, 2017. (All references not cited herewith have been previously made of record.).

Office Action in corresponding European Application No. 12714850.0-1218 dated Jan. 16, 2019. (All references not cited herewith have been previously made of record).

* cited by examiner

DEVICES AND METHODS USING NETWORK LOAD DATA IN MOBILE CLOUD ACCELERATOR CONTEXT TO OPTIMIZE NETWORK USAGE BY SELECTIVELY DEFERRING CONTENT DELIVERY

RELATED APPLICATION

This application is related to, and claims priority from, U.S. Provisional Patent Application Ser. No. 61/578,460 entitled "SERVERS AND METHODS FOR OPTIMIZING NETWORK USAGE IN MOBILE CLOUD ACCELERATOR CONTEXT", filed on Dec. 21, 2011 and U.S. Provisional Patent Application Ser. No. 61/578,840 entitled "APPARATUSES AND METHODS USING NETWORK LOAD DATA IN MOBILE CLOUD ACCELERATOR CONTEXT TO OPTIMIZE NETWORK USAGE BY SELECTIVELY DEFERRING CONTENT DELIVERY", filed on Dec. 21, 2011.

TECHNICAL FIELD

The present invention generally relates to network devices and methods used for optimizing a network usage by selectively deferring (delaying) a delivery of content via the network to terminals, when network load data indicates that the network load is high when the content is requested.

BACKGROUND

In the last years, the demand of content transmission to mobile and fixed user equipment (UEs) has increased dramatically due to the explosion of capacity, variety and number of UEs. This increased demand has challenged the mobile network operators to find more efficient traffic management techniques. A variety of hardware and software generically named mobile cloud accelerator (MCA) concur in making it possible to deliver content to users more promptly, efficiently and seamlessly than when a source server caters directly to the UEs. For example, as illustrated in FIG. 1, in a conventional mobile network system 1, a UE 10 (which can be a mobile or a fixed terminal) receives multimedia content from a content provider 20, via MCA 30. Within the MCA 30, the actual delivery of the content to the UE 10 may be controlled by the Mobile Network Operator (MNO) and may be subjected various mechanisms like radio prioritization, proxy caching using Akamai type content delivery network (CDN), transparent internet cache (TIC), etc.

While FIG. 1 is a schematic diagram illustrating the functionality of a conventional system, FIG. 2 is a block diagram of a typical mobile network system 101, in which the mobile network 110 (managed by a mobile network operator entity) includes MCA 120. A Mobile Edge Server (MES) 122 may store content received from a content provider (CP) 140. The modules illustrated in FIG. 2 may be combinations of software and hardware and may be hosted in a single node or distributed. Multiple instances of the illustrated blocks may run simultaneously. All MCAs may be supervised by a MCA Network Operation Center (NOC) 126. The Smart Pipe Controller (SPC) module 124 of the MCA 120 is connected to the Packet Core Resource Function (PCRF) module 132 and the Gateway GPRS Support Node (GGSN) 134. The SPC module 124 is a policy control node responsible for making QoS requests to the PCRF module 132. The PCRF module 132 implements the 3GPP policy control function and its purpose is to delegate the policy requests (e.g. QoS policy) to packet core and RAN nodes. The GGSN module 134 is configured to enable the interworking between the GPRS network and external packet switched networks, like the Public Internet 150. The Radio Access Network (RAN) module 138 intermediates the communication between user equipment (UE) 130 and the mobile network 110. The interface Gi is a demarcation between where the mobile network functionality ends and the Public Internet functionality begins. Similarly, the interface Rx is a demarcation between MCA 20 and the other mobile network functions or modules, and the interface Gx bridges between the PCRF module 132 and the GGSN module 134. Domain Name Servers (DNS), such as, DNS Server 136 provide IP addresses in response to an Internet domain name, based on databases stored therein.

The mobile network 110 communicates with contact providers, such as, the CP 140, the mapping system of content provider servers not linked to MCA MES, such as, the Akamai system 144, and other servers, such as, a server 142 that is outside the MCA 120. The content providers, such as, the CP 140, the server 142, and the Akamai system 144, etc. may be owned and operated by different entities than the MNO.

Recently, the manner in which applications in mobile terminals interact with network functions has shifted in the sense that the network devices update periodically the network about changes that have occurred in the device. Some of the changes may be at a low level such as the user may not be aware or in control of the changes. For example, synchronization of status information—new contacts, new documents, or new photographs—is stored not only in the mobile device, but also in the mobile network. Moreover, sometimes plural mobile devices are interconnected (e.g., an iPhone and an iPad belonging to the same person) such as their content is synchronized via the network (iCloud). However, the content synchronization is not usually time sensitive and the user is not usually sensitive to how prompt the synchronization occurs. This trend (shift) indicates that the mobile networks are going to be more and more solicited to store and transfer across more and more data (i.e., content).

It has been observed that network usage varies dramatically during a day (i.e., a 24 hours period). There are off-peak hours during the night and in the morning, and peak hours during the working time and evenings. During the peak hours the traffic may become slower because the mobile network is congested. The graph in FIG. 3 illustrates the daily variation of throughput in a mobile network. It would be beneficial if some of the traffic demand during peak hours (e.g., delivery of non-time sensitive content) would be shifted to the off-peak hours.

Moreover, although at the overall mobile network management level (i.e., the radio network controller, RNC), throughput volume fluctuations in time may not be visible, at a cell level, the throughput volume fluctuations may be significant. The graphs in FIGS. 4A and 4B illustrate the short term evolution of throughput volume. The y-axis represents throughput volume with different portions showing different type of traffic, and the x-axis represents time. The graph in FIG. 4A illustrates the throughput volume over one hour for multiple cells as viewed by the RNC. The graph in FIG. 4B illustrates the throughput volume over the same hour for a single cell. It would be advantageous to use the gaps in throughput volume at the cell level to transmit non-time sensitive content. In other words, the gaps in throughput volume at the cell level indicate opportunities to transmit non-time sensitive content without congesting the network even during peak hours.

The conventional systems and methods fail to address optimization of network usage by taking into consideration the type of content to be delivered, i.e., whether the content is time-sensitive (such as when it is related to a "live" communication) or the content is non-time sensitive (such as, software updates or synchronization of content in different terminals). Currently the non-time sensitive content is sent over to the requesting terminal promptly (i.e., as soon as the request is processed) regardless of the state of usage of the network (i.e., whether there is low traffic or the network is congested). Delivery of the non-time sensitive content during the peak hours further congests the network. Network congestion is undesirable from the point of view of the network operator and leads to unsatisfied subscribers.

Frequently, the non-time sensitive content (e.g., software updates and inter-devices content synchronization data) is hosted by an MCA MES. Both when the content is stored on an MCA MES (e.g., an Akamai CDN server) and when the content is stored on another server, the desired content is delivered regardless of the current network traffic.

Many software updates are now preferably performed over WiFi historically and to avoid mobile network congestion, because of the software updates frequently require transfer of large files. However, if the network congestion problem were overcome, performing software updates via mobile network would become attractive to subscribers due to the larger coverage and affordability of the mobile network.

In fact, it is currently possible to gather and analyze traffic information over the mobile network. For example, Ericsson has developed a traffic analysis module, Ericsson Network IQ (ENIQ) that is configured to gather, store, model, and analyze information related to the mobile network traffic, and to yield reports useable for performance assessment, resource planning and service assurance. ENIQ is capable to provide subscriber session analysis, business intelligence analysis, terminal analysis, network analysis and a ranking engine.

Frequently, the non-time sensitive content (e.g., software updates and inter-devices content synchronization data) is hosted in the MCA by a mobile edge server (MES), such as, an Akamai cache server. Currently, many software updates, and content related to Apple type of applications (e.g., iBook and iTunes) are typically hosted on MCA MES.

FIG. 5 exemplarily illustrates a trace of messages exchanged in a conventional mobile network 150 using a conventional method for delivery of non-time sensitive content stored in a MCA cache server (e.g., MCA-MES). The MCA of the mobile network 150 includes a network of Akamai servers of two types. The first type of Akamai server runs software to redirect a client toward a closest Akamai server of the second type that actually stores content sought by the client. A UE 160 (i.e., the client) initiates delivery of non-time sensitive content at S1. The UE 160 may be, for example, an iDevice, such as, an iPad, initiating receiving an iBook.

The UE 160 sends a request including a domain (network) name (e.g., se.itunes.apple.com) to an Akamai Domain Name System (DNS) Server 170 at S2, and receives in response an Internet Protocol (IP) address (e.g., 2.22.240.87) of an Akamai server 180 of the first type, at S3. The Akamai DNS server 170 runs special-purpose networking software that returns an IP address in response to a network name, using a database of network names and IP addresses.

The UE 160 then communicates with the Akamai server 180 to receive the network name of the closest Akamai server 185 of the second type that stores a list of the content (e.g., a list of iBooks) for the UE 160 at S4. At S5 and S6, the UE 160 interacts again with the Akamai DNS server 170 to receive the IP address of the Akamai server 185. At S7 and S8, the UE 160 communicates with the Akamai server 185 to receive the list of the content.

Based on a user selected item from the list (e.g., an iBook), the UE 160 sends another request including a network name to the Akamai Domain Name System (DNS) Server 170 at S9, and receives in response an Internet Protocol (IP) address of another Akamai server 190 of the first type, at S10. The UE 160 then communicates with the Akamai server 190 to receive the network name of the closest Akamai server 195 of the second type that stores the selected content (e.g., the iBook), at S11.

At S12, the UE 160 sends the network name of the Akamai server 195 to the Akamai DNS server 170 to receive, at S13, the IP address of the Akamai server 195. At S14, the UE 160 requests the selected content (e.g., the iBook) from the Akamai server 195, and, at S15, the UE 160 receives the selected content from the Akamai server 195.

However, the non-time sensitive content may not be hosted by a cache server of the mobile network (i.e., a MCA-MES). For example, FIG. 6 exemplarily illustrates a trace of messages exchanged in a conventional system 200 using a conventional method for delivery of non-time sensitive content that is stored on another server than a MCA MES. In this situation, a network of Akamai servers of the mobile network performs a mapping function related to the content stored or to be stored on the non-Akamai servers (i.e., the server other than an MCA MES). The trace of messages in FIG. 5 may, for example, be related to the Apple photostream service that stores content on a network of MS Azure servers.

The UE 210 (e.g., an iDevice) initiates a sequence of steps S1-S6 during which UE 210 communicates with the mobile network servers (the Akamai DNS server 220, and the Akamai servers 230 and 240) in a manner similar to the situation in which the content is stored on MCA MES. As a result of these steps, the UE 210 receives the network name of the closest non-Akamai (e.g., MS Azure) server 250 storing or in which to store the desired content (e.g., photo file).

Similar to the situation described relative to FIG. 5, the Akamai DNS server 220 runs special-purpose networking software that provides an IP address in response to a network name, based on a database of network names and IP addresses. The Akamai server 230 provides the network name of the closet Akamai server 240 storing the map of the non-Akamai servers, to the UE 210. Further, the Akamai server 240 provides the network name of the closest non-Akamai (MS Azure) server 250. The sequence S1-S6 constitutes the Akamai's global traffic management service.

At S7, the UE 210 sends the network name of the server 250 the Akamai DNS server 220, to receive, at S8, the IP address of the server 250. Then, at S9, the UE 210 communicates with the non-Akamai server 250 to post or to download the desired content (e.g., a photo).

Both when the content is stored on an Akamai server (i.e., MCA-MES) and when the content is stored on another server, the desired content is delivered regardless of the current network traffic.

Many software updates are now preferably performed over WiFi historically and to avoid mobile network congestion, because of the software updates frequently require transfer of large files. However, if the network congestion problem were overcome, performing software updates via mobile network would become attractive to subscribers due to the larger coverage and affordability of the mobile network.

Accordingly, it would be desirable to provide network devices, systems and methods that optimize network usage by selectively deferring delivery of non-time sensitive content depending on the network load at the time when the request for content delivery is received.

SUMMARY

Some embodiments describe hereinafter provide the advantage that by selectively deferring delivery of non-time sensitive content, the network congestion problem is alleviated. Another advantage is the mobile network operators having such a capability of selectively deferring delivery of non-time sensitive content become more attractive to end users, both due to better traffic during peak hours and for being charged less if a delivery of non-time sensitive content is deferred. An object of some embodiments is to provide network devices and methods capable to implement selectively deferring delivery of non-time sensitive content based on network load information.

According to one exemplary embodiment, there is a network device including a communication interface and a processing unit. The communication interface is configured to enable communication with a client device, and to receive a request for a content delivery from the client device. The processing unit is configured to determine whether to defer the request depending on a network load at a time when the request has been received.

According to another embodiment, there is a cache server in a mobile network including a communication interface, a memory and a processing unit. The communication interface is configured to enable communication with a client device that submits a request for a delivery of content. The memory is configured to temporarily store a content specified in the request. The processing unit is configured to send a query to a network module as to whether to proceed with delivering the content depending on a network load. If a response to the query is positive, the processing unit controls the communication interface to send the content stored in the memory to the client device. If the response to the query is negative, the processing unit generates a message to indicate, to the client device, that the request is deferred, and controls the communication interface 910 to send the message to the client device.

According to another exemplary embodiment, there is a charging device including a communication interface and a processing unit. The communication interface is configured to enable communication with a network device that submits an indication that a request for a content delivery of a client device has been deferred. The processing unit is configured to control charging a rate different from a regular rate to a client account corresponding to the request for the content delivery when the indication has been received.

According to another exemplary embodiment, there is a method performed by a network device including receiving a request for a content delivery from a client device in the network, and determining whether to defer the request depending on network load when the request has been received.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a mobile network with MCA, i.e. an MCA mobile network system. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 7:
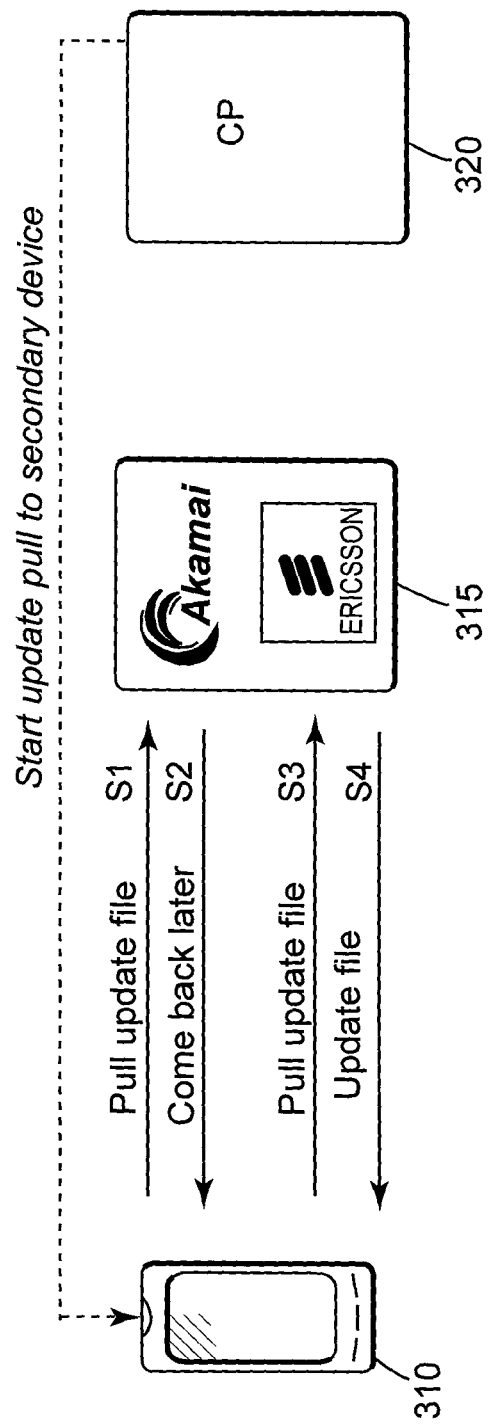
FIG. 7 is flow diagram illustrating operations in a network system according to an exemplary embodiment.

According to some embodiments, in order to optimize network usage, a network device operating in the context of MCA is configured to defer delivery of non-time sensitive content if the network usage is high when a request for such delivery is received. In the following description, it should be understood that content whose delivery may be deferred is non-time sensitive content. For example, in FIG. 7, a UE 310 may be prompted by a content provider (CP) 320 that downloading (i.e., pulling) content such as a software update has become due. However, the UE 310 may initiate the content transfer due to its own operation. In a MCA system, the UE 310 receives or sends the content from/to a cache server, which may be part of the MCA or may be another server dedicated to a service provided over the mobile network. The UE 310 sends a request (e.g., the message "pull update file") for delivery of the content to a network device (e.g., a cache server) 315, at S1. If the network usage is high when the request for delivery is received, the network device 315 returns a delivery deferral indication (e.g., the message "come back later") in response to the UE's request, at S2. After a time period elapses, the UE 310 may reiterate the request at S3. If the network usage is not high when the request for delivery is reiterated, the network device 315 sends the content to the UE 310, at S4. In contrast, a conventional network device sends the content to a requesting UE as soon as the request is received, regardless the network usage at the time.

Figure 8:
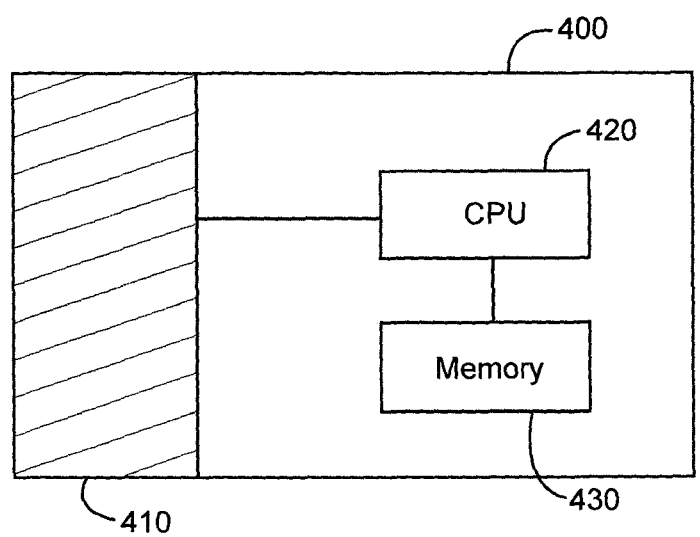
FIG. 8 is a schematic diagram of a network device according to an exemplary embodiment.

A network device 400 operating as described above has a communication interface 410 and a processing unit 420, as exemplarily illustrated in FIG. 8. The communication interface 410 is configured to enable communication with a client device (i.e., the UE), and to receive a request for a content delivery from the client device. The processing unit 420 is configured to determine whether to defer the request depending on a network load at a time when the request has been received. The client device may be a mobile edge server (MES) configured to store temporarily the content, a Domain Name Server (DNS) configured to store a database storing pairs of domain names and Internet Protocol (IP) addresses, or a user equipment (UE).

The processing unit 420 may be configured such that (A) if determined that the client request is not deferred, to generate a first message to be send to the client via the communication interface, the first message enabling the content delivery, and (B) if the request is deferred, to generate a second message to be send to the client device via the communication interface. The second message may include a time value indicating when to resubmit the client request. This time value may be an absolute time value or a time interval after which to resubmit the request.

In one embodiment, the network device 400 may further include a data storage unit 430 connected to the processing unit 420. The network device 400 may then be configured to operate as a cache server, and to store temporarily the content. In this case, the first message may include the content.

The network device 400 including a data storage unit 430 may also be configured to operate as a Domain Name Server (DNS), and to store pairs of domain names and Internet Protocol (IP) addresses. In this case, the request may include a domain name and the first message may include an IP address corresponding to the domain name.

In one embodiment, the processing unit 420 may be configured to infer the network load by comparing a time when the request has been received with daily network load data including peak hours and off-peak hours. If the time when the request has been received corresponds to the peak hours the processing unit may defer the request.

In another embodiment, the processing unit 420 may be configured to determine the network load based on information extracted from a network load database depending on the time when the request has been received. The network load database may be historical database storing data related to past network load. However, the network load database may be a near real-time database fed with current network load information by a module configured to perform network traffic analysis (e.g., ENIQ). The network database may be stored in a data storage unit (e.g., 430) or may be stored on another network device in communication with the network device 400 via the communication interface 410 or another network load database interface.

In yet another embodiment, the processing unit 420 may be configured to determine the network load based on latest network load information received from a module configured to perform network traffic analysis (e.g., ENIQ), at a time when the request has been received.

Some embodiments may further be configured to communicate with a billing module via a billing module interface (not shown) or the communication interface 410, the processing unit 420 then being further configured to generate a billing report reflecting whether the request is deferred, to be sent to the billing module.

The processing unit 420 may further be configured to operate as a smart pipe controller within a mobile cloud accelerator.

Figure 5:
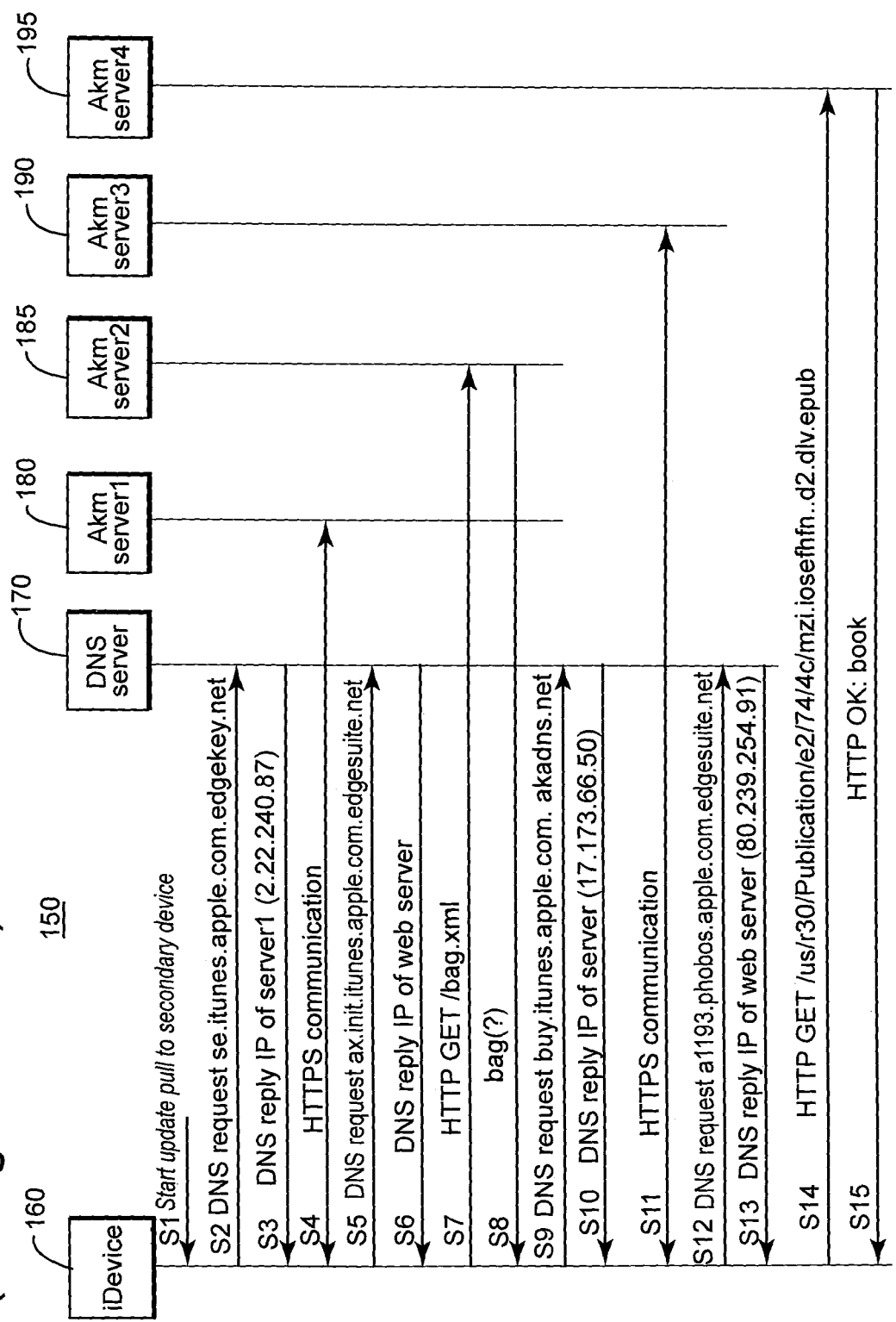
FIG. 5 is a diagram illustrating a trace of messages related to conventional delivery of content stored in a MCA cache server.
Figure 9:
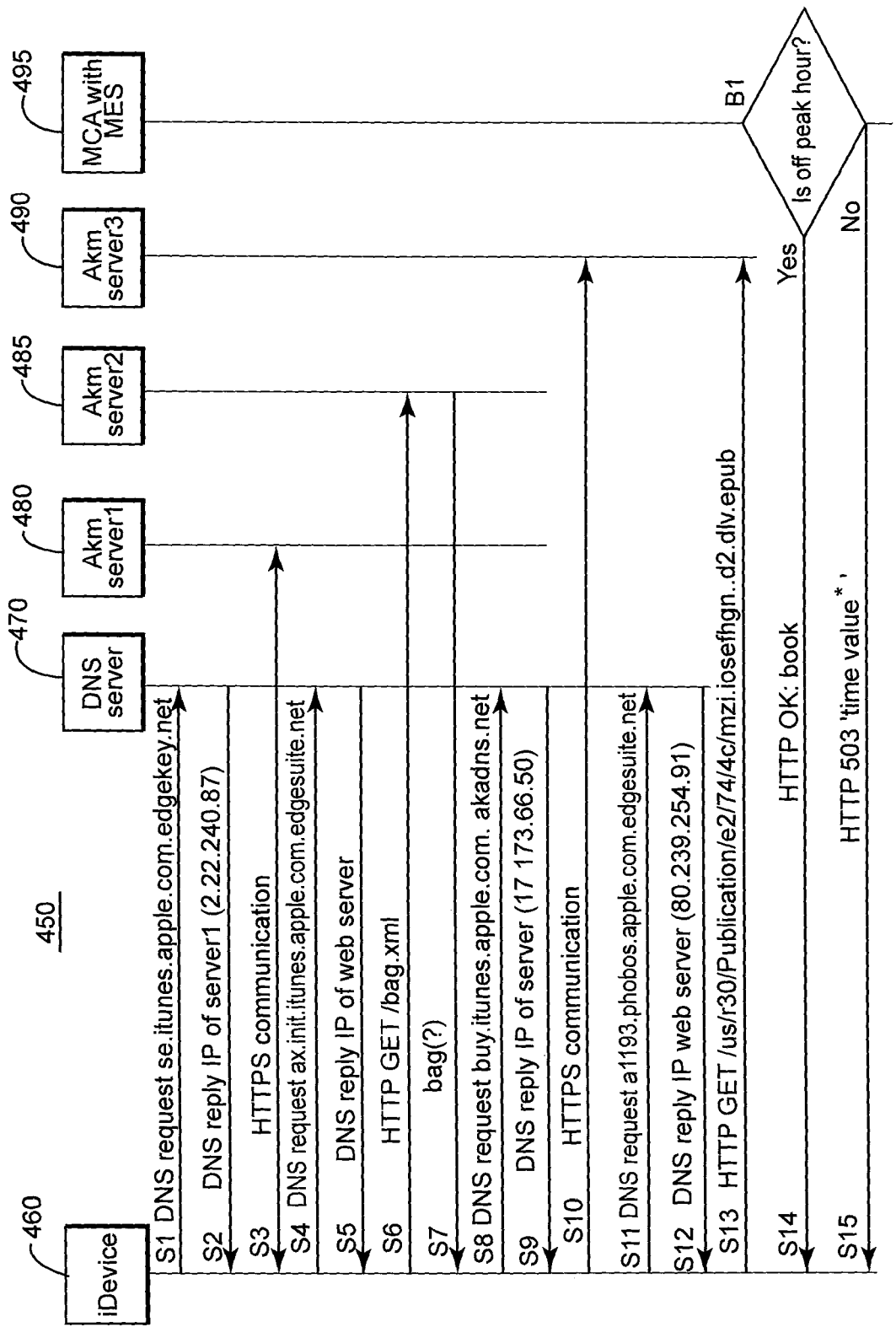
FIG. 9 is a diagram illustrating a trace of messages related to delivery of content stored in a MCA cache server, according to an exemplary embodiment.

More specifically, considering now a situation in which the content is stored in a MCA cache server. FIG. 9 exemplarily illustrates a trace of messages exchanged in a mobile network 450 using a method for delivery of content stored in a MCA cache server (e.g., MCA-MES) according to an exemplary embodiment. The MCA of the mobile network 450 includes (Akamai) servers 470, 480, 485 and 490. The messages exchanged between the client device 460 and the servers 470, 480, 485 and 490 at S1-S12 are similar to the messages exchanged between the client device 160 and the servers 170, 180, 185 and 190 in FIG. 5, at S2-S13. The description of S1-S12 in FIG. 9 is therefore omitted for brevity.

The Akamai server 495 may be part of the MCA and may store the desired content (e.g., the iBook). As illustrated by the decision block B1, the (Akamai) server 495 is configured to evaluate whether the network load is high upon receiving the request to deliver the content at S13. For example, the server 495 may evaluate whether the moment during a 24 hour period at which the request was received is during an off-peak hour (i.e., it is not during peak hours as defined based on historical observations).

If the server 495 decides that the network traffic is not high, i.e., the "YES" branch of the decision block B1, the server 495 delivers the content at S14. In addition, the content delivery S14 may be sent over a low priority QoS connection to avoid interferences with other traffic that may be sent over the air interface during the transfer of data S14. If the server 495 decides that the network traffic is high, i.e., the "NO" branch of the decision block B1, the server 295 sends a message indicating that the delivery has been deferred to the client 460 at S15. This message may include time value as to when the client 460 to request again delivery of the content (e.g., an HTTP 503 message).

Figure 10:
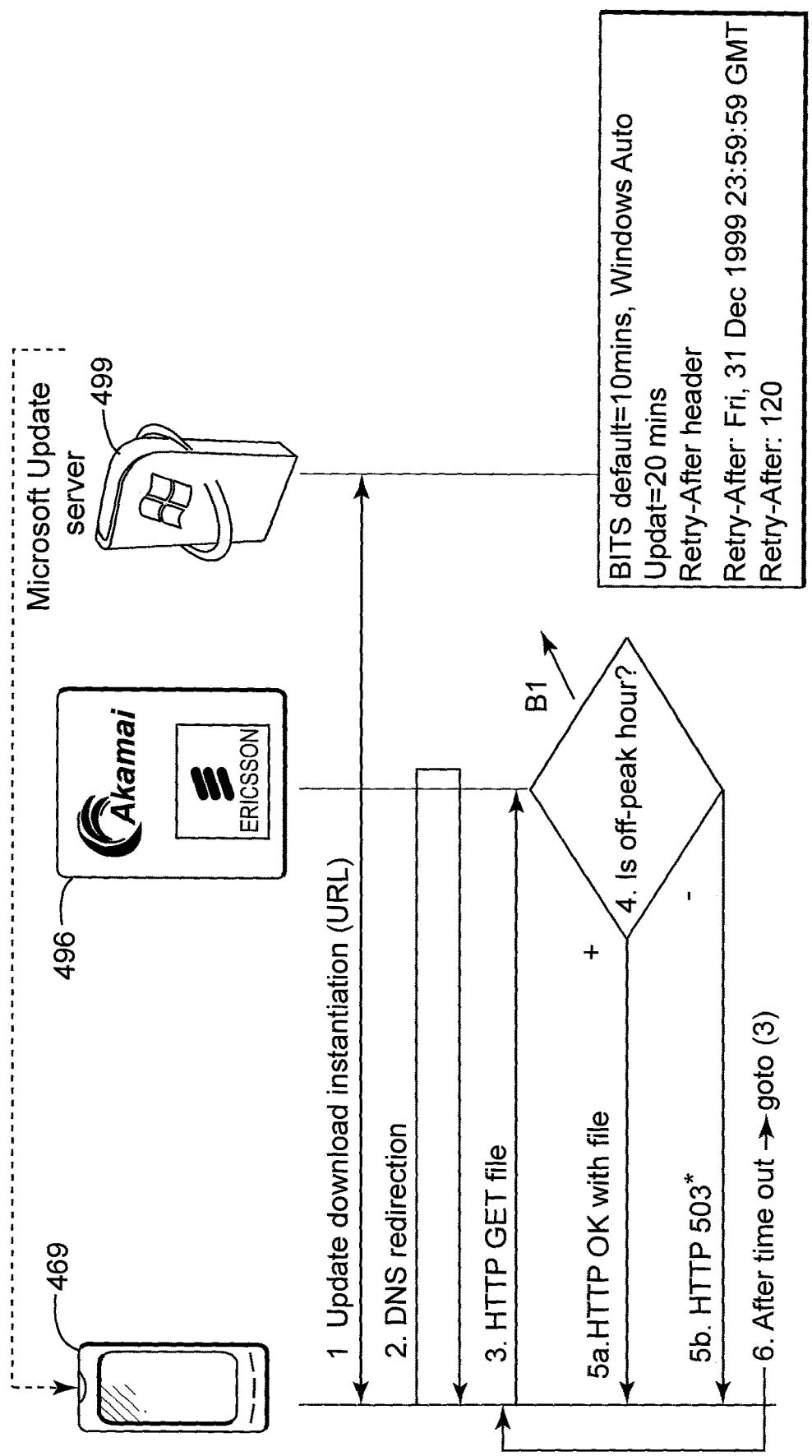
FIG. 10 is a diagram illustrating a trace of messages related to delivery of content stored in a non-MCA cache server, according to an exemplary embodiment.

A similar scenario may occur in connection with Microsoft updates for devices operating under Windows operating system as illustrated in FIG. 10. Microsoft provides a Background Intelligent Transfer Service (BITS) as a Microsoft Windows OS component, to facilitate prioritized, throttled, and asynchronous transfer of files for updating components of Windows, using idle mobile network bandwidth. FIG. 10 exemplarily illustrates a trace of messages exchanged in a mobile network according to embodiment in connection with BITS.

At S1, the Microsoft update server 499 sends an update download initiation message to a client (e.g., a UE) 469 that uses Microsoft software including BITS (e.g., Windows operating system). An MS BITS client may also initiate the download based on end user's preferences, which are configured by the end user via a software application interface (API). The network device 496 may be a part of the MCA of the mobile network, and may include, for example, the servers 460, 470, 475, 480, and 495 in FIG. 9. The S2 "DNS redirection" step may stand for S2-S12 in FIG. 9. S3 in FIG. 10 may correspond to S13 in FIG. 9, B1 in FIG. 10 may correspond to B1 in FIG. 9, S4 in FIG. 10 may correspond to S14 in FIG. 9, and S5 in FIG. 10 may correspond to S15 in FIG. 9.

The HTTP 503 message sent from the network device 496 may include a "Retry-After" header that may specify a date (e.g., Fri, 31 Dec. 1999 23:59:59 GMT) when the BITS service component of the client device 469 to retry delivery of the Microsoft software updating file. Alternatively, the "Retry-After" header may specify a numeric value representing a number of seconds after which the BITS service component of the client device 469 to retry delivery of the Microsoft software updating file. By default, the BITS service component of the client device 469 would retry delivery of the Microsoft software updating file after 10 minutes. For another updating component, Windows Auto update, the client device 469 would retry delivery of the Microsoft software updating file by default in 20 minutes.

Figure 11:
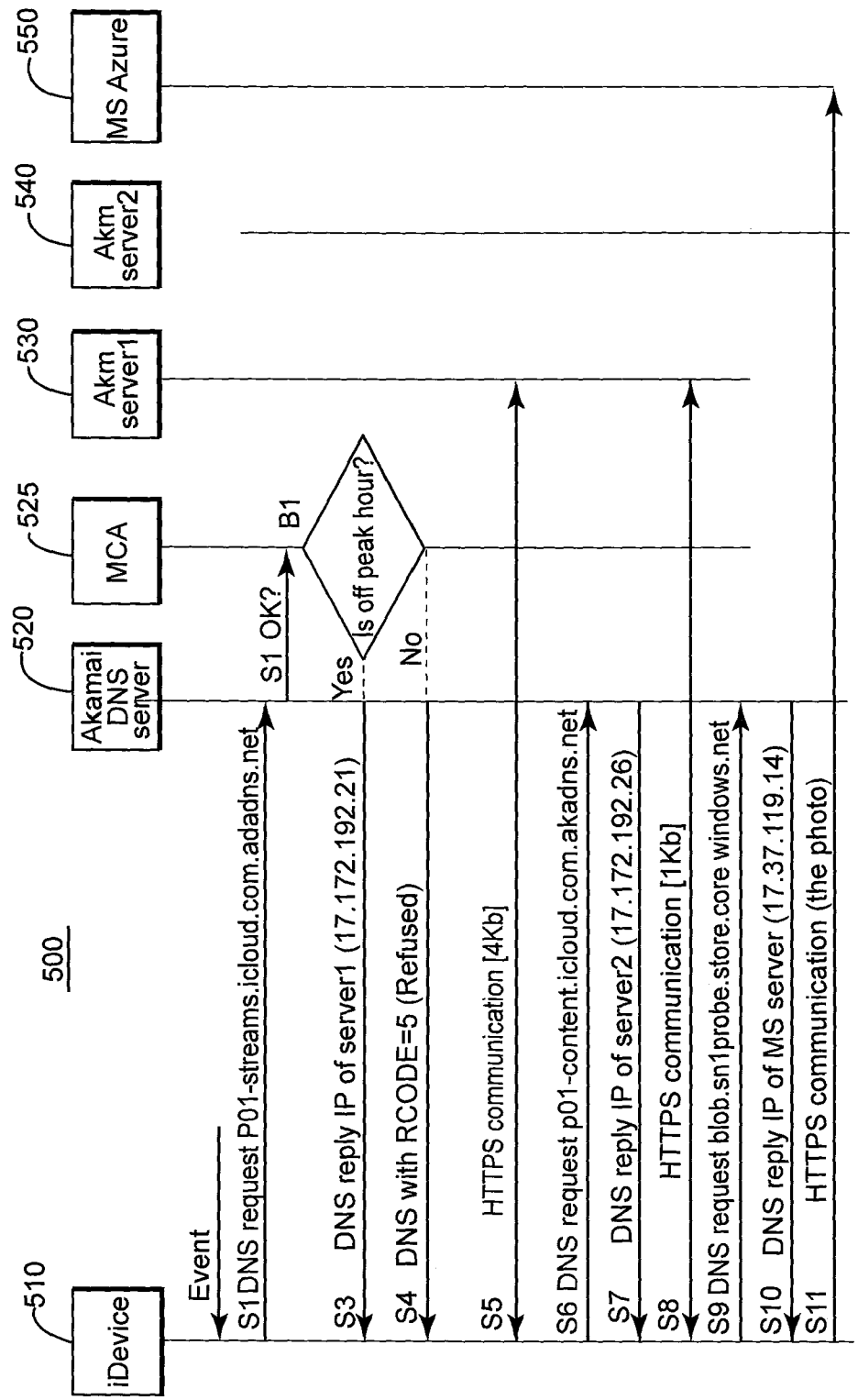
FIG. 11 is a diagram illustrating a trace of messages related to delivery of content stored in a non-MCA cache server, according to another exemplary embodiment.

FIG. 11 is a diagram illustrating a trace of messages related to delivery of content stored in a non-MCA cache server (such as, an MS Azure server), according to another exemplary embodiment. The MCA of the mobile network 500 includes Akamai type servers 530 and 540 and is connected to a non-Akamai server 550. The servers 530, 540 and 550 are configured and operate similar to the servers 230, 240 and 250 in FIG. 6. The client device 510 initiates a content delivery at S1 by sending a network name to the (Akamai) DNS server 520.

The DNS server 520 is configured to contact an MCA module 525 at S2, instead of responding immediately to the request. The MCA module 525 evaluates whether the network load (traffic) is high at B1. For example, the MCA module 525 may evaluate whether the moment during a 24 hour period at which the request was received is during an off-peak hour (i.e., it is not during peak hours as defined based on historical observations).

If the MCA module 525 decides that the network load is not high, i.e. the "YES" branch of the decision block B1, the DNS server 520 sends the IP address of server 530 to the client device 510 at S3. If the MCA module 525 decides that the network load is high, i.e. the "NO" branch of the decision block B1, the DNS server 520 sends a message indicating that the delivery has been deferred to the client device 510 at S4.

Figure 6:
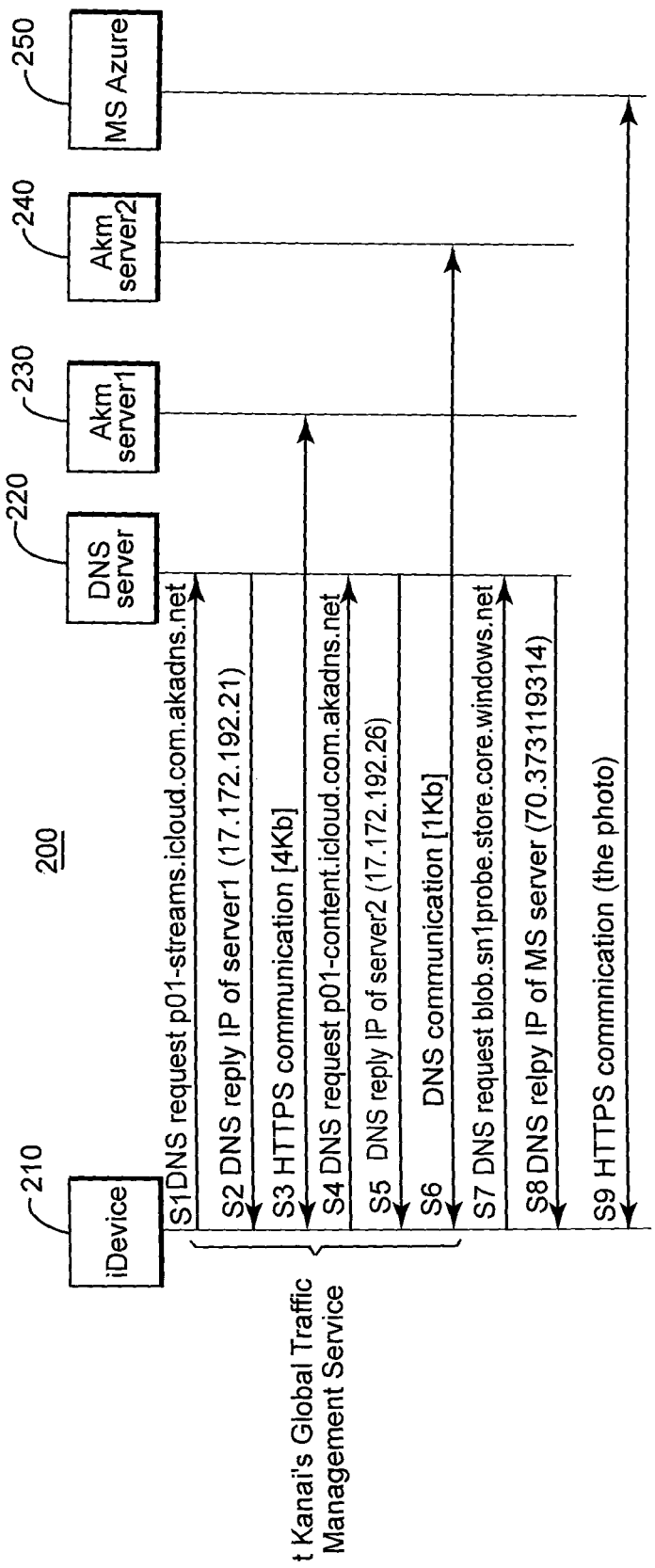
FIG. 6 is a diagram illustrating a trace of messages related to conventional delivery of content stored in a non-MCA cache server.

The messages exchanged at S5-S11 between the client device 510 and the servers 530, 540, and 550 are similar to the messages exchanged at S3-S9, between the client device 510 and the servers 230, 240, and 250 in FIG. 6. The description of S5-S11 in FIG. 11 is therefore omitted for brevity.

Although some equipment, such as, the servers 520, 530, 540 are designated as Akamai produced equipment, the present inventive concept should not be limited by features of equipment produced by Akamai. In a broader view, the network device 400 as illustrated FIG. 8 even without a memory 430 can be configured to perform the functionality described for the network devices 315, 495, 496, and 525 in FIGS. 7, 9, 10, and 11, according to the exemplary embodiments.

In describing the following embodiments, the manner in which the MCA modules operate and interact for selectively deferring content delivery based on the network load data is described in more detail.

Figure 1:
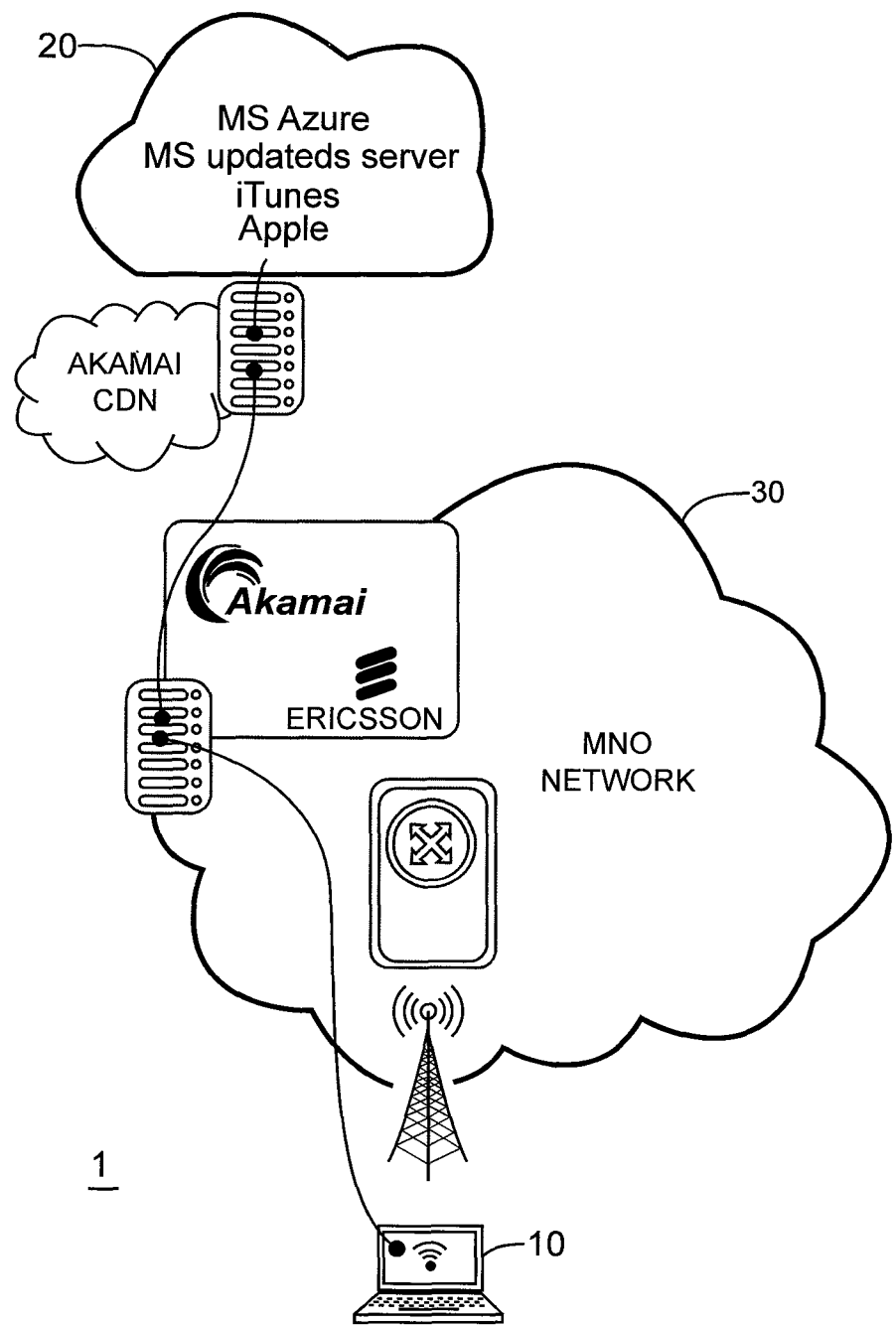
FIG. 1 is a schematic diagram of a conventional MCA network system.
Figure 2:
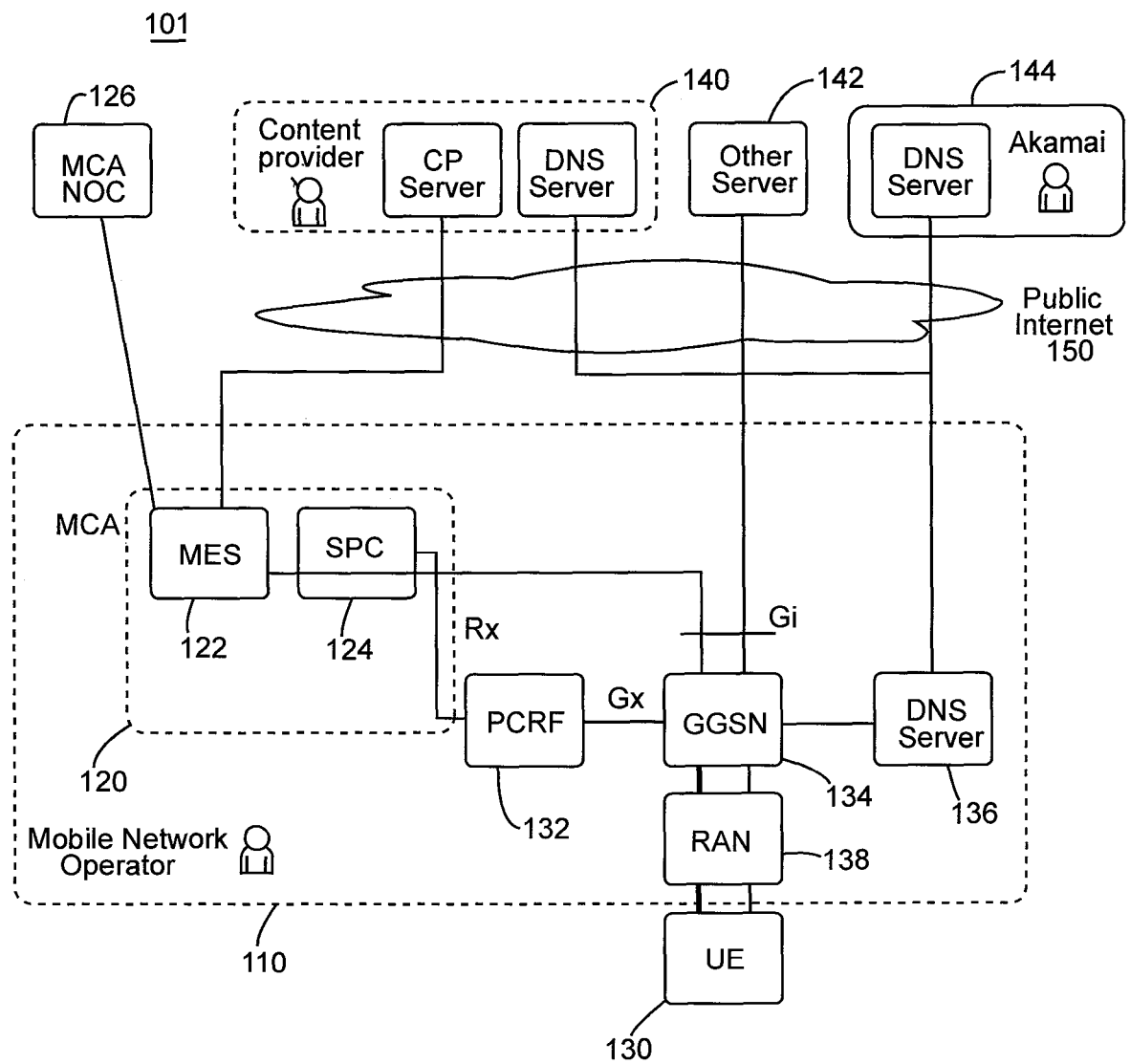
FIG. 2 is a block diagram of a conventional MCA mobile network system.
Figure 3:
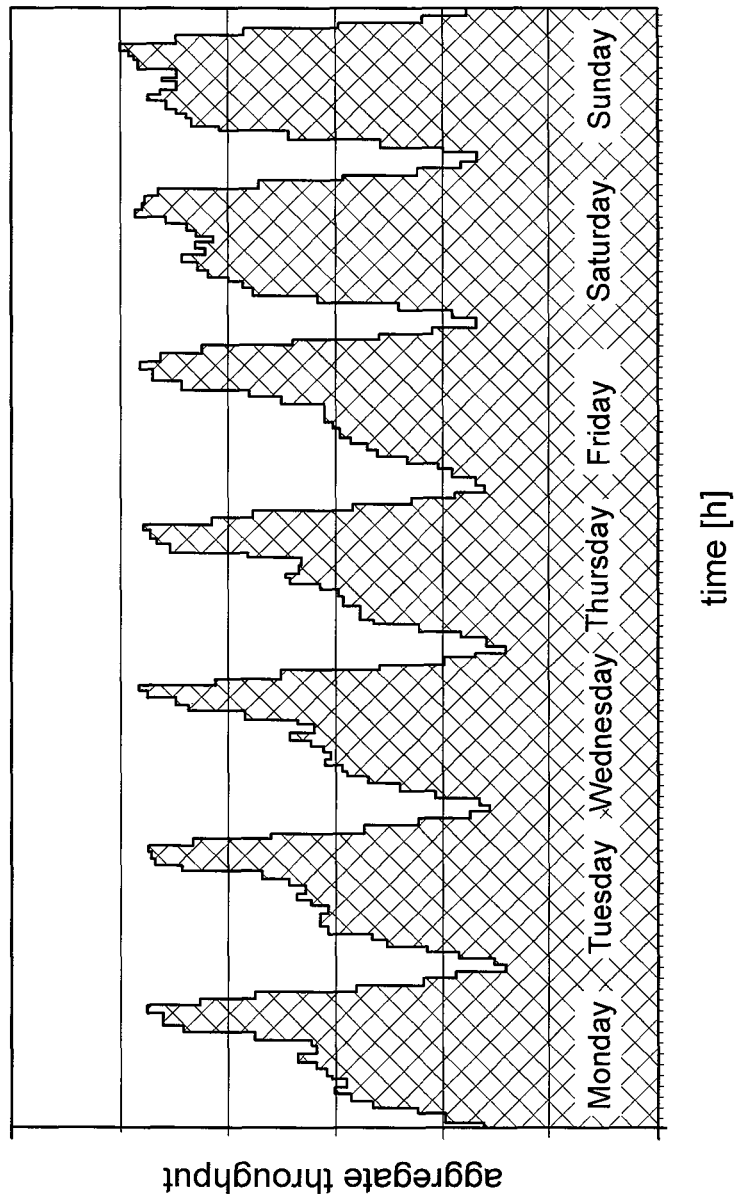
FIG. 3 is a graph illustrating the daily variation of throughput in a conventional mobile network.
Figure 4A:
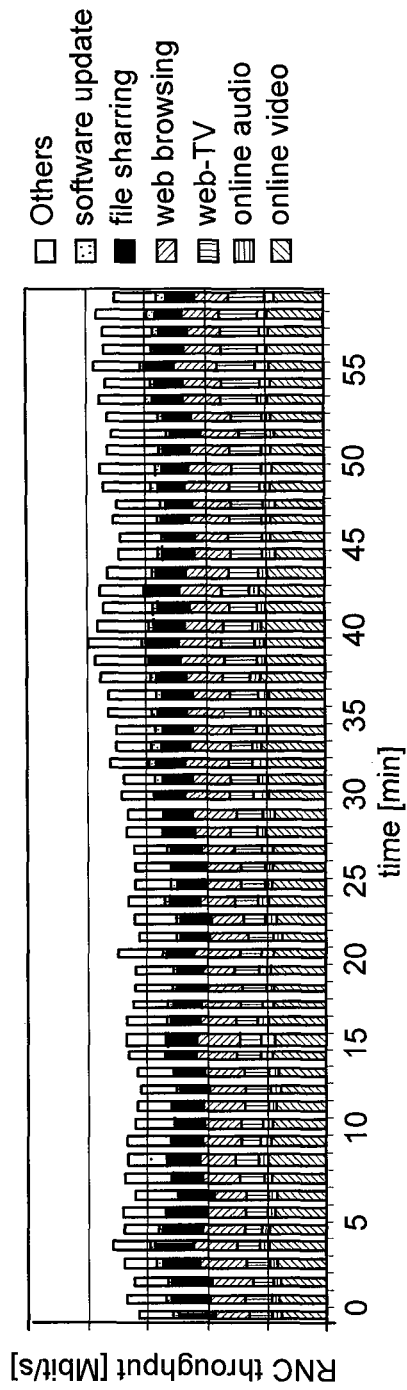
FIGS. 4A and 4B are graphs illustrating throughput evolution in a conventional network at the network level and at a cell level.
Figure 4B:
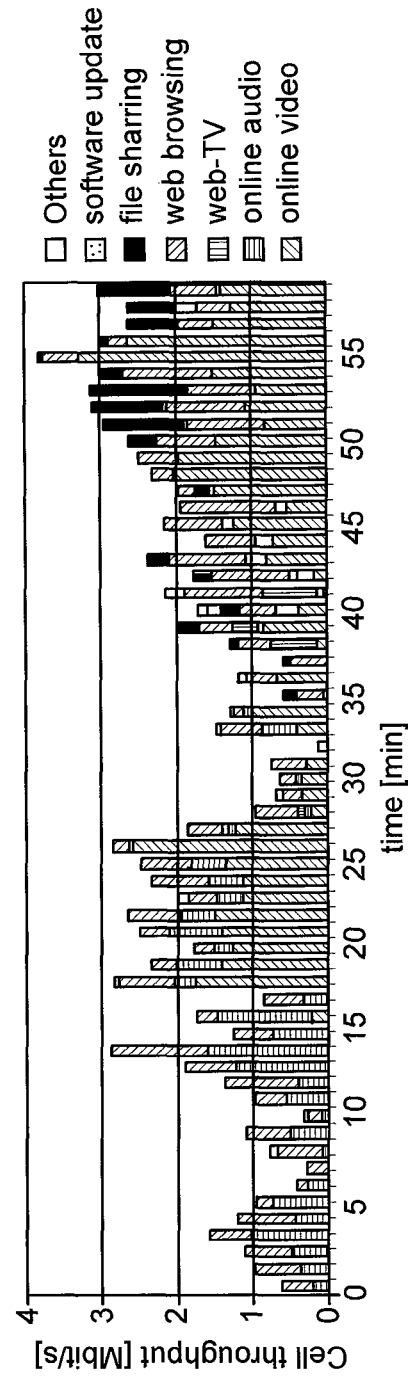
Figure 12:
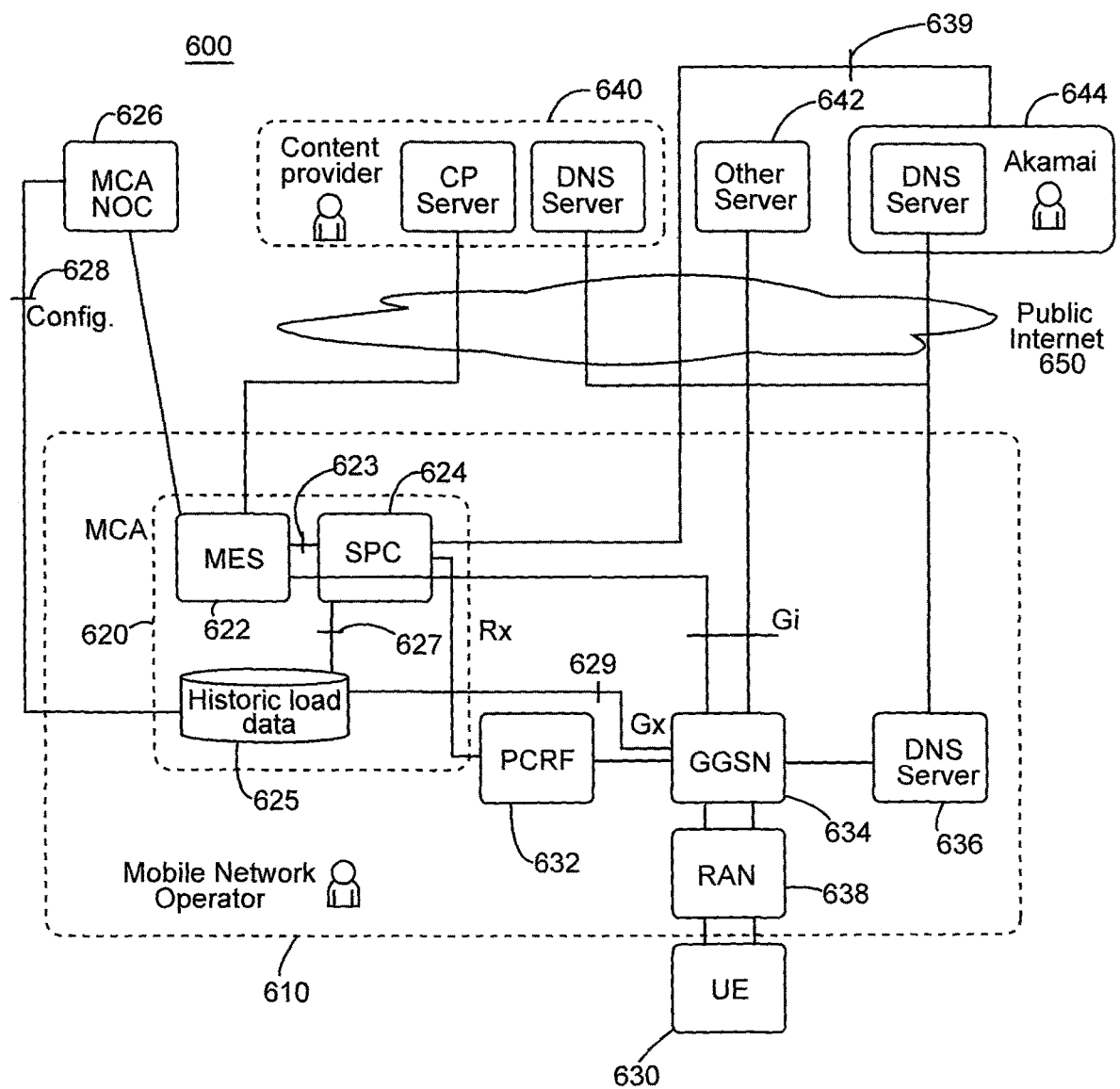
FIG. 12 is a schematic diagram of a mobile network system in which SPC uses historic load data to decide whether to defer delivery of content, according to an exemplary embodiment.

FIG. 12 is a schematic diagram of an MCA mobile network system 600 in which an SPC module 624 uses historic load data to decide whether to defer delivery of content, according to an exemplary embodiment. Some components of the MCA mobile network system 600 in FIG. 12 are similar to the ones illustrated in FIG. 2 and their description is omitted for brevity. The system 600 includes plural interfaces that enable the SPC module 624 to access network load information and to communicate with servers storing the content. The SPC module 624 is configured to decide whether to defer delivery of the content based on historic network load data stored in the MCA database 625. The interfaces are a combination of hardware and software, e.g., are programs that, when executed by a processor, provide a predetermined functionality.

A first interface 623 connects a MCA MES cache server 622 and the SPC module 624, and enables the MCA MES cache server 622 (1) to ask the SPC module 624 to decide whether delivery of the content stored in the MCA MES 622 to be deferred, and (2) to receive the result of the decision from the SPC module 624.

The system 600 may include a second interface 639 in addition or instead of the first interface 623, the second interface connecting the SPC module 624 to mapping system 644. The second interface 639 enables the mapping system 644 (A) to ask the SPC module 624 to decide whether delivery of the content stored in the mapped content provider servers to be deferred, and (B) to receive the result of the decision from the SPC module 624.

The database 625 located in the MCA 620 stores historic load data. A third interface 627 may connect the SPC module 622 to the database 625. The MCA mobile network system 600 may further include a fourth interface 628 connecting the database 625 to the MCA NOC 626, to enable configuring and loading historic data into the database 625.

The MCA mobile network system 600 may also include another interface 629 connecting the database 625 and the GGSN module 634. The interface 629 may be used to feed information about charging preferences of the clients into the database 625. A user (e.g., client 630) pays for a certain amount of data transfer using the mobile network. The amount of data transfer may be expressed as a volume of peak time transfer, named bandwidth cap. However, if the user sets its charging preferences such that to preferentially receive content during off-peak hours, the charge (i.e., how much is subtracted from the bandwidth cap) is less (down to no charge) than how much it would be subtracted of the content would have been delivered during the peak hours. Thus, the user may set its charging preferences to favor data transfer during off-peak hours. In deciding whether to defer content delivery, the SPC module 624 may take into consideration the user's charging preferences as stored into the database 625.

The MES 622, the SPC module 624, the database 625, the interfaces 623, 627, 628, 629, and 639 may incorporate novel features enabling the MCA mobile network system 600 to defer delivery of content when the mobile network is congested, such as, during peak traffic hours.

Figure 13:
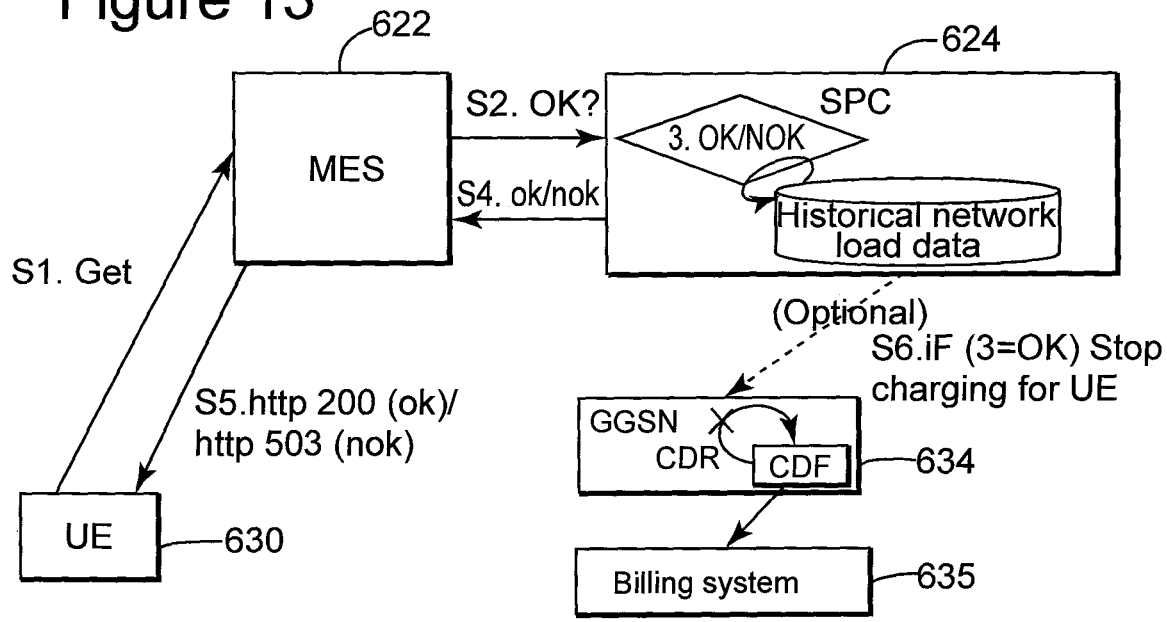
FIG. 13 is a diagram illustrating a trace of messages triggered by a request for delivery of content stored in an MCA MES, according to another exemplary embodiment.

FIG. 13 is a diagram illustrating a trace of messages triggered by a request for delivery of content stored in a MCA MES 622, in the MCA mobile network system 600 illustrated in FIG. 12. First, at S1, the client 630 sends a request for a delivery of content ("get") to MCA MES 622. At S2, the MCA MES 622 send a message to the SPC module 624 via the first interface 623, to inquire whether to proceed with the delivery. At S3, the SPC module 624 determines whether to defer the delivery based on historical network load data stored in the database 625. For example, if the request has arrived during the peak hours as determined from the historical data, the delivery is deferred (i.e., NOK). At S4, the result of the decision is communicated from the SPC module 624 to the MES 622 via the interface 623. If the result (OK) was to proceed with the delivery of the content, the MES 622 then sends the content to the client 630 (e.g., an "http 200" message), at S5. If the result (NOK) was to defer the delivery of the content, the MES 622 sends a message indicating deferral (e.g., an "http 503" message) to the client 630, at S5.

At S6 (which is optional), the SPC module 624 may further send a message to the GGSN module 634 (which is connected to a billing system 635) to indicate to charge less or to stop charging the end user in order to compensate the user for waiting for the delivery of content. Thus, if the network is not congested, the user receives the content promptly, while if the network is congested, the user has to wait until later and would be compensated for the delay.

Figure 14:
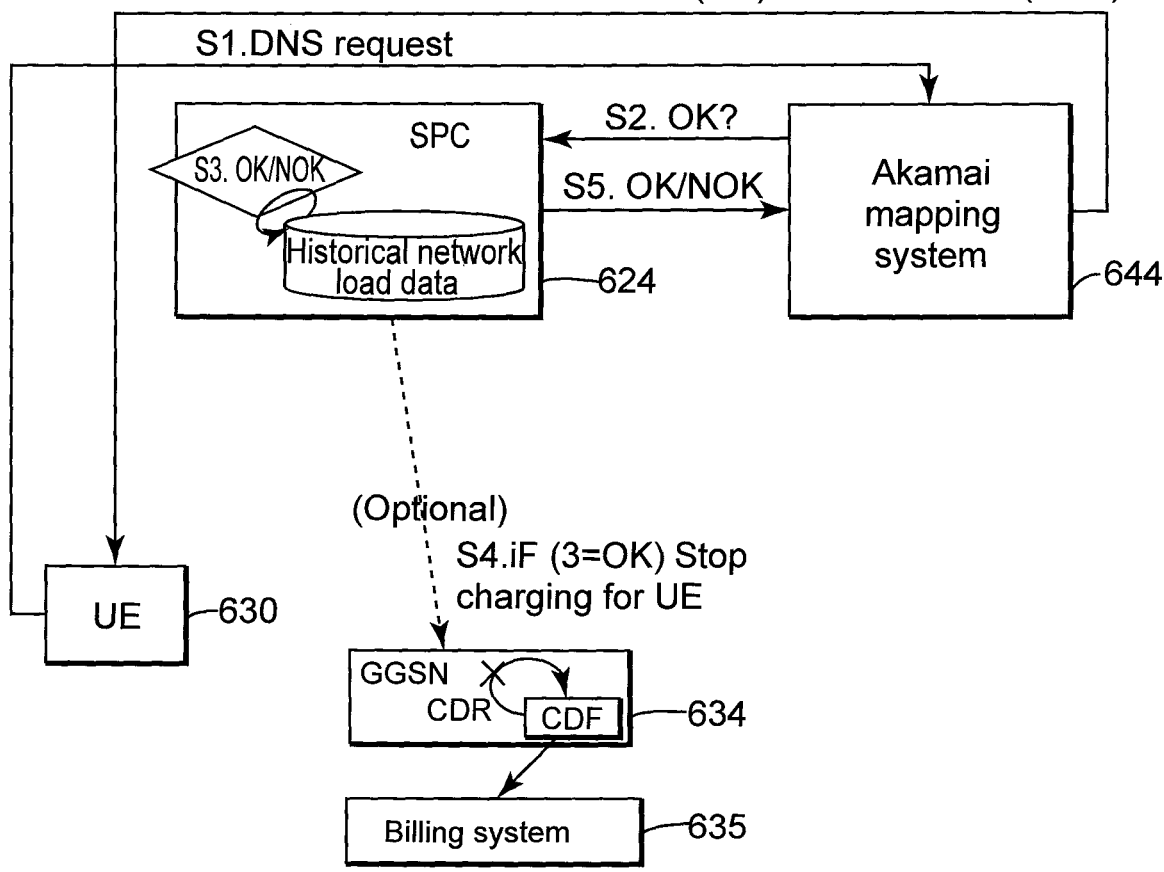
FIG. 14 is a diagram illustrating a trace of messages triggered by a request for delivery of content stored in a server outside the MCA, according to another exemplary embodiment.

FIG. 14 is a diagram illustrating a trace of messages triggered by a request for delivery of content stored in a server 645 outside the MCA 620, in the MCA mobile network system 600 illustrated in FIG. 12. At S1, the client 30 requests the Akamai mapping system 644 to provide the IP address of the server storing the desired content. At S2, the Akamai system 644 asks the SPC module 624 whether to proceed with the delivery, via the interface 639. At S3, the SPC module 624 determines whether to defer the delivery based on historical network load data stored in the database 625. At S4, if the result of the decision is to continue the delivery (OK), the SPC module 624 sends a message to GGSN 364 (this optional functionality has been described relative to FIG. 13 and it is not repeated for brevity). If the result (OK) was to proceed with the delivery of the content, the Akamai mapping system 644 provides the IP address of the server storing the desired content to the client 630 (e.g., sends an "http 200" message), at S5. If the result (NOK) was to defer the delivery of the content, the Akamai mapping system 644 sends a message indicating deferral (e.g., an "http 503" message) to the client 630, at S5.

The SPC module 624 may be configured one, the other, or both functions illustrated in FIGS. 13 and 14.

Figure 15:
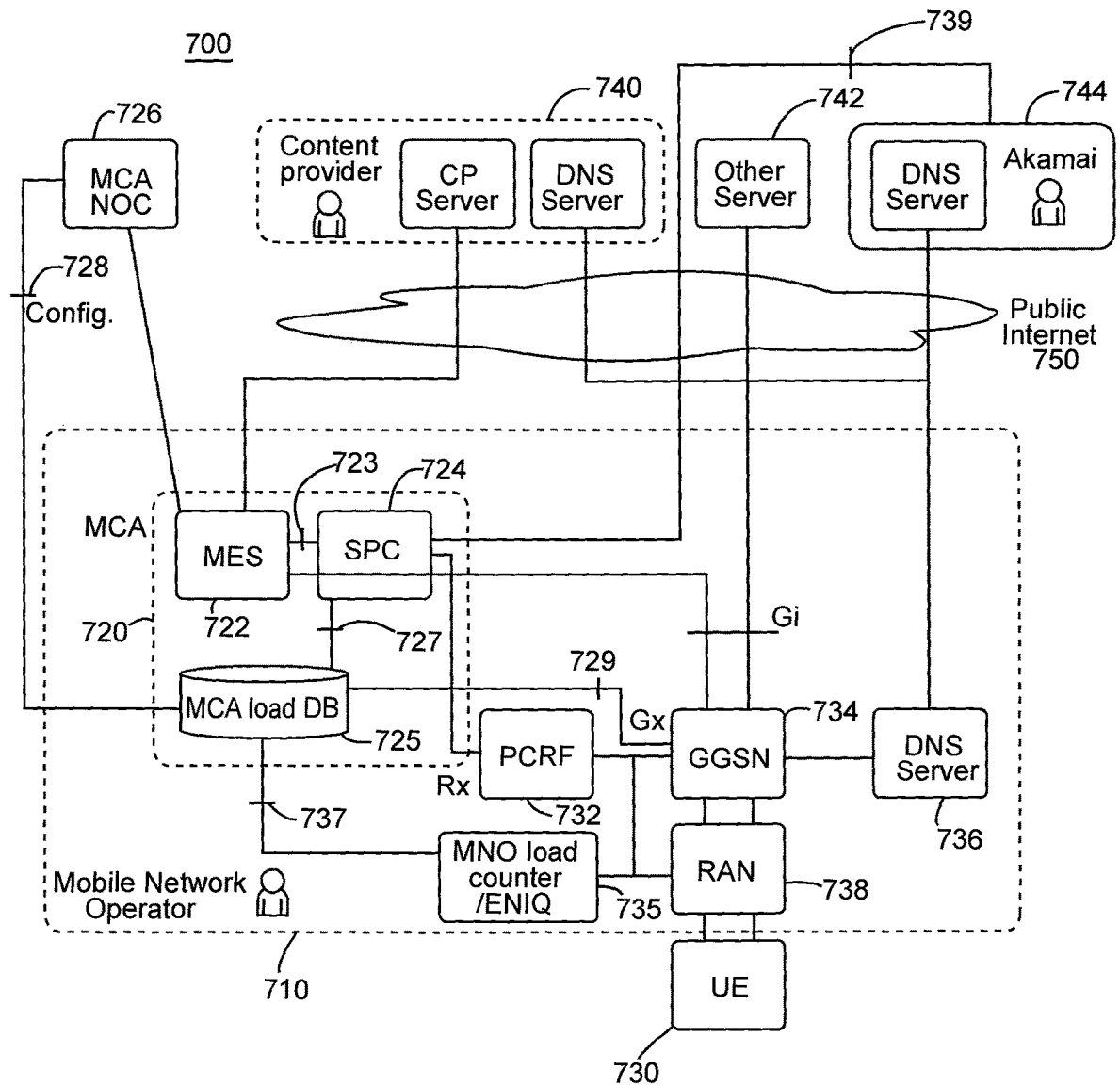
FIG. 15 is a schematic diagram of a mobile network system in which SPC uses near real time load data stored in an MCA database, to decide whether to defer delivery of content, according to an exemplary embodiment.
Figure 18:
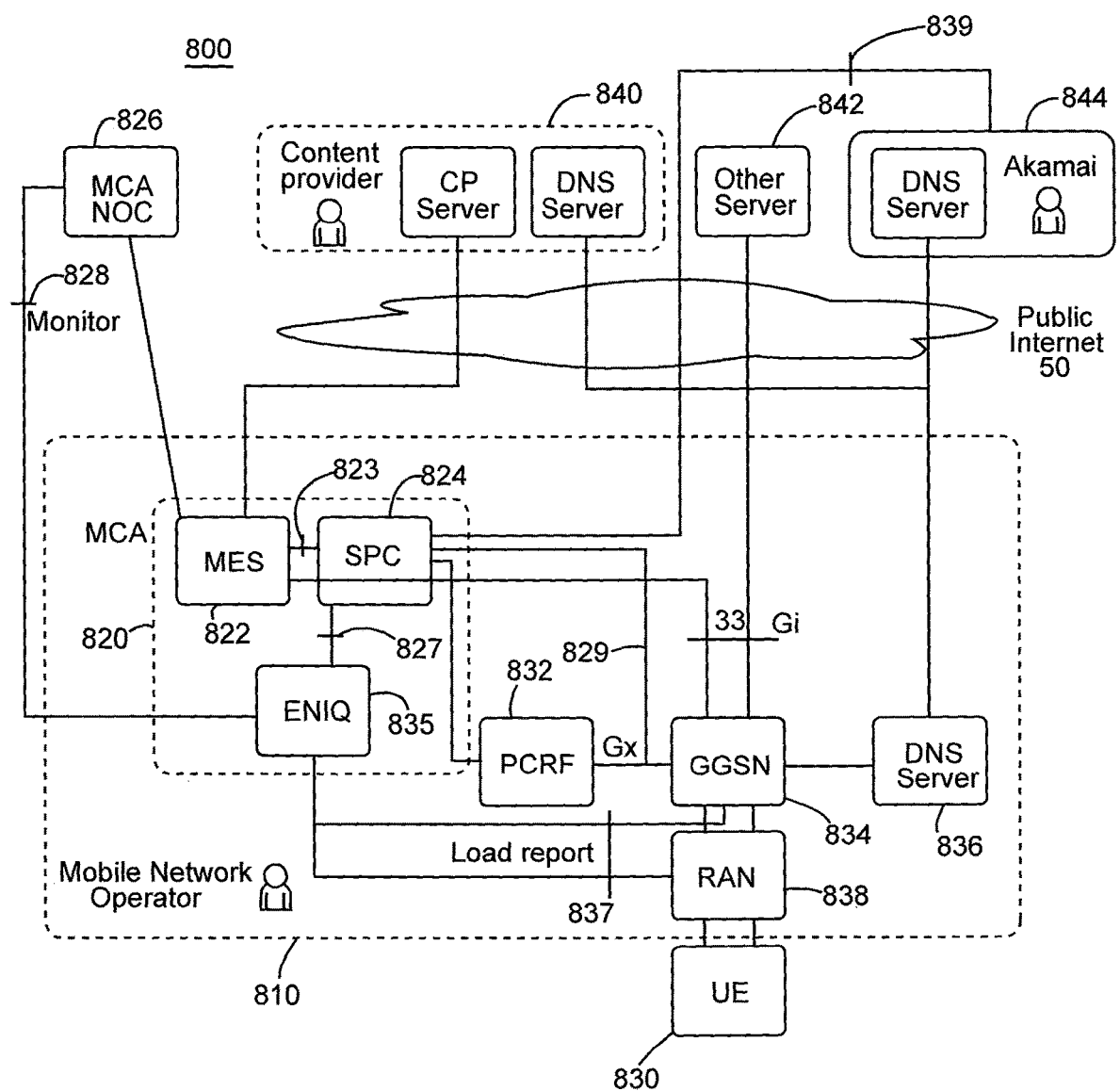
FIG. 18 is a schematic diagram of a mobile network system in which SPC receives near real time network load data from an ENIQ module in MCA, to decide whether to defer delivery of content, according to an exemplary embodiment.

FIGS. 15 and 18 illustrate MCA mobile network systems 700 and 800, respectively, using near real time data to decide whether to defer delivery of the content.

FIG. 15 is a schematic diagram of an MCA mobile network system 700 in which an SPC module 724 uses near real time load data stored in an MCA database 725 to decide whether to defer delivery of content, according to an exemplary embodiment. Some components of the MCA mobile network system in FIG. 15 are similar to the ones illustrated in FIG. 12 and their description is omitted for brevity.

The system 700 includes plural interfaces that enable the SPC module 724 (which is configured to decide whether to defer delivery of content based on near real time network load data) to access the database storing network load data and to communicate with servers storing the content. The interfaces are a combination of hardware and software, e.g., are programs that, when executed by a processor, enable a predetermined functionality.

A near real time MCA load database 725 located in the MCA 720 stores besides historic load data received from the MCA NOC 726 via the interface 728 and reports loaded periodically via interface 737 from a load counter or an ENIQ module 735 that are outside the MCA 720. The interface 728 connecting the database 725 to the MCA NOC 726 may also enable MCA NOC 726 to monitor the MCA load database 725.

The SPC module 724, the database 725, the interfaces 728 and 737 may incorporate features differentiating the MCA mobile network system 700 from the MCA mobile network system 600. The MCA mobile network system 700 is configured to defer delivery of content when the mobile network is congested, based on near real time load data stored in the database 725.

Figure 16:
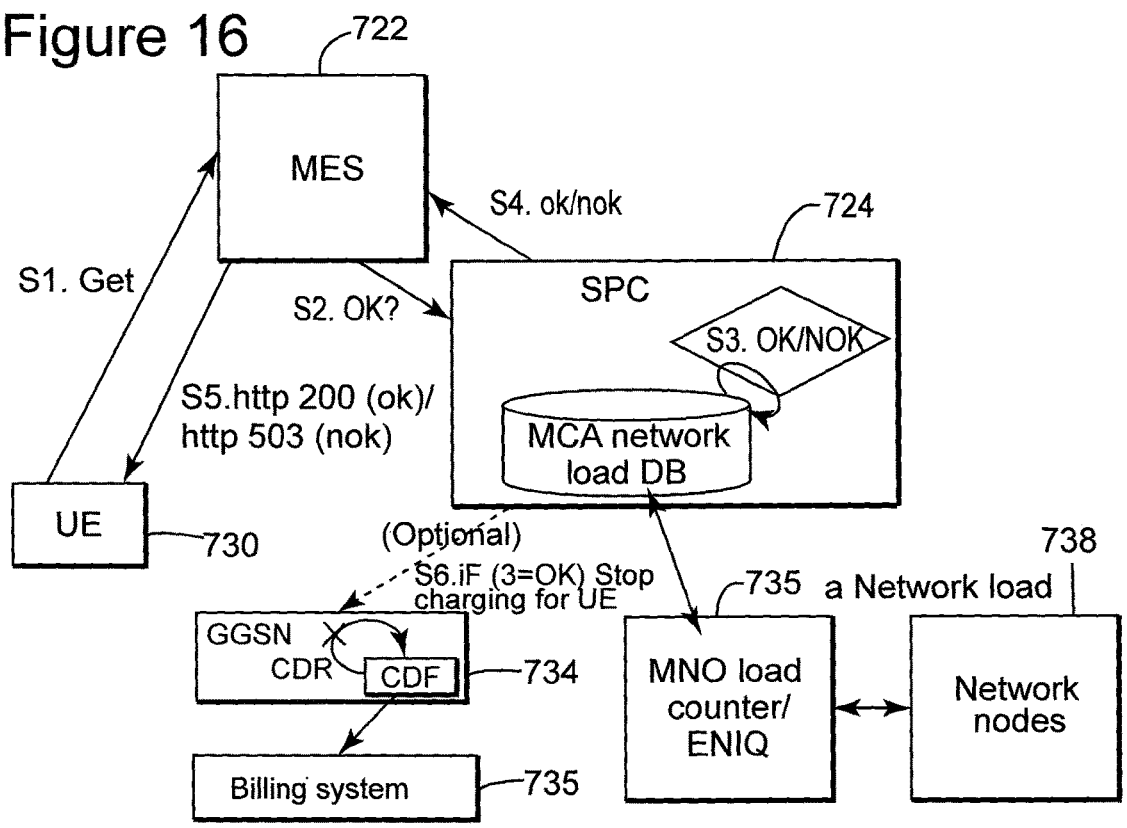
FIG. 16 is a diagram illustrating a trace of messages triggered by a request for delivery of content stored in an MCA MES, according to another exemplary embodiment.

FIG. 16 is a diagram illustrating a trace of messages triggered by a request for delivery of content stored in an MCA MES 722, in the MCA mobile network system 700 illustrated in FIG. 15. The messages S1-S5 in FIG. 16 are similar to the messages S1-S5 illustrated and described relative to FIG. 13. However, unlike the SPC module 624, the SPC module 724 uses near real time network load data stored the database 725 to decide whether the delivery of content to be deferred. The database 725 is updated via the interface 737 with network load information received from a network load counter or an ENIQ module 735 that may be located outside the MCA 720. The network load counter or ENIQ module 735 gathers the network load information from the network nodes 738.

At S6, if the result of the decision is to continue the delivery (OK), the SPC module 724 may (optionally) further send a message the GGSN module 734 (which is connected to a billing system 735) to charge less or to stop charging the end user in order to compensate the user for waiting for the delivery of content.

Figure 17:
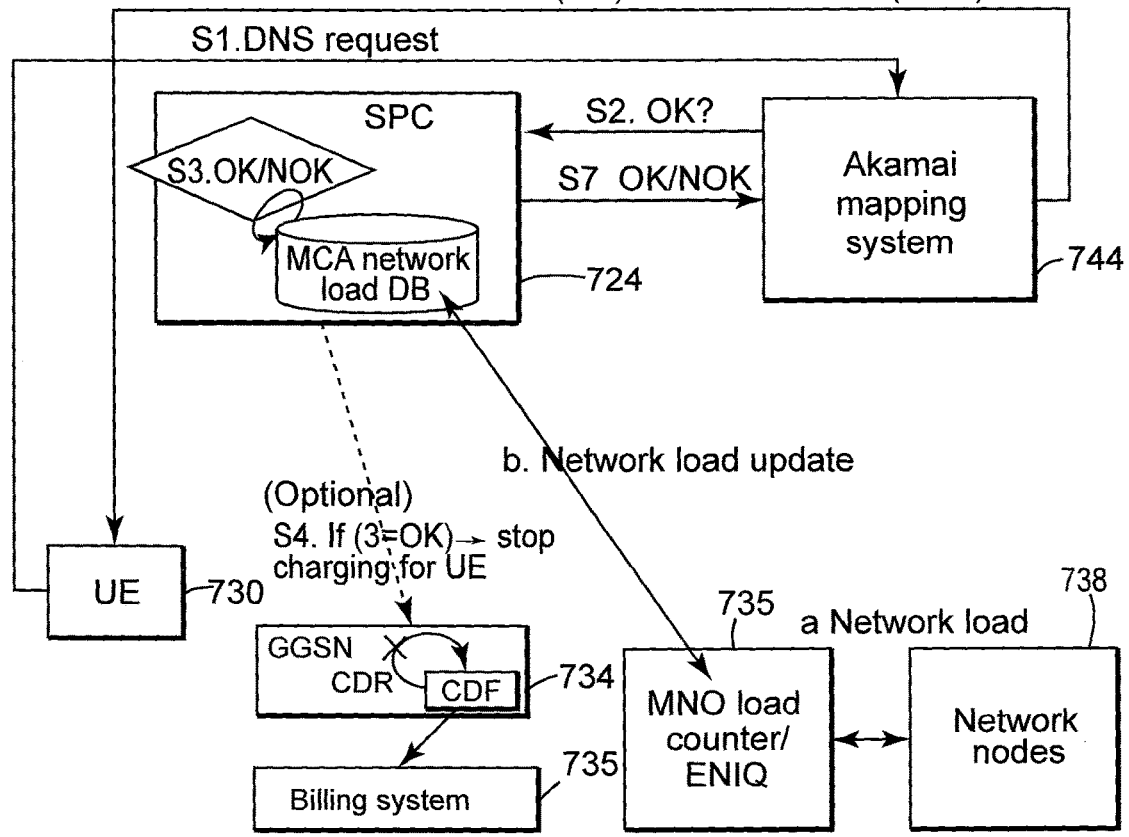
FIG. 17 is a diagram illustrating a trace of messages triggered by a request for delivery of content stored in a server outside the MCA, according to another exemplary embodiment.

FIG. 17 is a diagram illustrating a trace of messages triggered by a request for delivery of content stored in a server outside the MCA 720, in the MCA mobile network system 700 illustrated in FIG. 15. At S1, the client 730 requests the Akamai mapping system 744 to provide the IP address of the server storing the desired content. At S2, the Akamai system 744 asks the SPC module 724 whether to proceed with the delivery, e.g., via the interface 739. At S3, the SPC module 724 determines whether to defer the delivery based on near real time network load data stored in the database 725. The database 725 is updated via the interface 737 with network load information received from the load counter or an EN IQ module 735 that are outside the MCA 220. At S4, if the result of the decision is to continue the delivery (OK), the SPC module 724 may (optionally) send a message to GGSN module 734 (which is connected to a billing system 735) to charge less or to stop charging the end user in order to compensate the user for waiting for the delivery of content.

At S5, the result of the decision is communicated from the SPC module 724 to the Akamai mapping system 744. At S6, if the result (OK) was to proceed with the delivery of the content, the Akamai mapping system 744 sends the IP of the server storing the desired content to the client 730. If the result (NOK) was to defer the delivery of the content, at S6, the Akamai server 744 sends a message ("DNS RCODE") indicating deferral of the delivery to the client 730.

The SPC module 724 may be configured one, the other, or both functions illustrated in FIGS. 16 and 17.

FIG. 18 is a schematic diagram of an MCA mobile network system 800 in which an SPC module 824 uses near real time load data received from an ENIQ module 835 in MCA 820, to decide whether to defer delivery of content, according to an exemplary embodiment. Some components of the MCA mobile network system 800 in FIG. 18 are similar to the ones illustrated in FIG. 15 and their description is omitted for brevity.

The system 800 includes plural interfaces that enable the SPC module 824 (which is configured to decide whether to defer delivery of content based on near real time network load data) to receive near real time network load data and to communicate with servers storing the content. The interfaces are a combination of hardware and software, e.g., are programs that, when executed by a processor, provide a predetermined functionality.

An ENIQ module 835 (i.e., a module configured to perform network traffic analysis) operates inside MCA 820, and receives load report information via an interface 837 from GGSN 834 and RAN 838. The SPC module 824 communicates with the ENIQ module 835 via interface 827. An interface 828 enables the MCA NOC 826 to monitor network load via the ENIQ module 835.

The SPC module 824 and the interfaces 827, 828 and 838 may incorporate features differentiating the MCA mobile network system 800 from the MCA mobile network system 700. The MCA mobile network system 800 is configured to defer delivery of content when the mobile network is congested, based on near real time load data received from ENIQ module 835.

Figure 19:
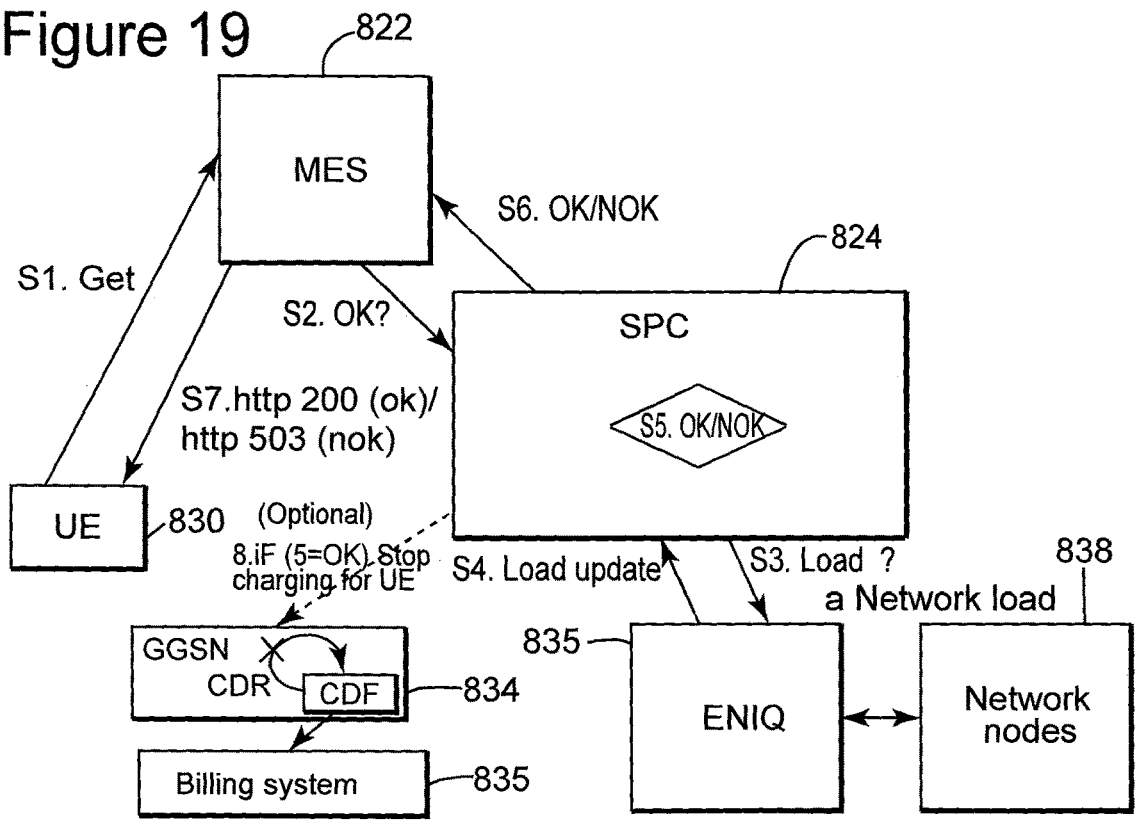
FIG. 19 is a diagram illustrating a trace of messages triggered by a request for delivery of non-time sensitive content stored in a MCA MES, according to another exemplary embodiment.

FIG. 19 is a diagram illustrating a trace of messages triggered by a request for delivery of content stored in an MCA MES 822, in the MCA mobile network system 800 illustrated in FIG. 18. The messages S1, S2, S5, S6, and S7 in FIG. 19 are similar to the messages S1-S5 illustrated and described relative to FIG. 13. However, in order to decide whether to defer the content at S5, the SPC module 824 asks the ENIQ module 835 to provide near real time network load information. In response, the ENIQ module 835 sends network load update information, at S4. The ENIQ module 835 may gather load information related to nodes 838 via the interface 837.

At S6, the SPC module 824 may further connect the GGSN module 834 (which is connected to a billing system 835) to charge less or to stop charging the end user in order to compensate the user for waiting for the delivery of content. This functionality is optional.

Figure 20:
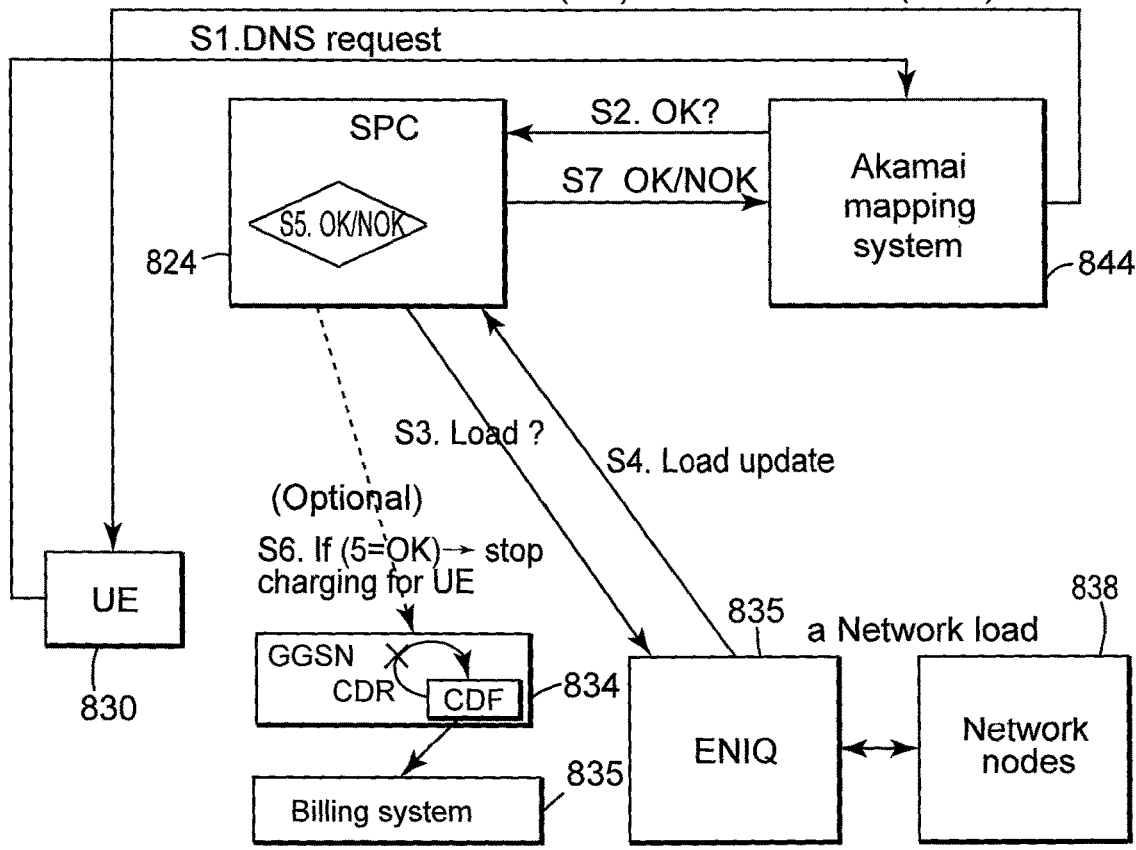
FIG. 20 is a diagram illustrating a trace of messages triggered by a request for delivery of non-time sensitive content stored in a server outside the MCA, according to another exemplary embodiment.

FIG. 20 is a diagram illustrating a trace of messages triggered by a request for delivery of content stored in a server outside the MCA 820, in the MCA mobile network system 800 illustrated in FIG. 18. At S1, the client 830 requests the Akamai mapping system 844 to provide the IP address of the server storing the desired content. At S2, the Akamai system 844 asks the SPC module 824 whether to proceed with the delivery (e.g., via the interface 839). At S3, the SPC module 824 sends a request for load information to the ENIQ module 835, and receives in response recent network load information, at S4. The ENIQ module 835 may gather the network load information related to nodes 838 via the interface 837.

At S5, the SPC module 824 decides whether to defer the delivery based on the received network load information. At S6, if the result of the decision is to continue the delivery (OK), the SPC module 824 may further send a message the GGSN module 834 (which is connected to a billing system 835) to charge less or to stop charging the end user in order to compensate the user for waiting for the delivery of content. This functionality is optional.

At S7, the result of the decision (OK/NOK) is communicated from the SPC module 824 to the Akamai mapping system 844, e.g., via the interface 839. At S8, if the result (OK) was to deliver of the content, the Akamai mapping system 844 sends the IP of the server storing the desired content to the client 830. If the result (NOK) was to defer delivery of the content, at S8, the Akamai server 844 sends a message ("DNS RCODE") indicating deferral of the delivery to the client 830.

The SPC module 824 may be configured one, the other, or both functions illustrated in FIGS. 19 and 20.

Figure 21:
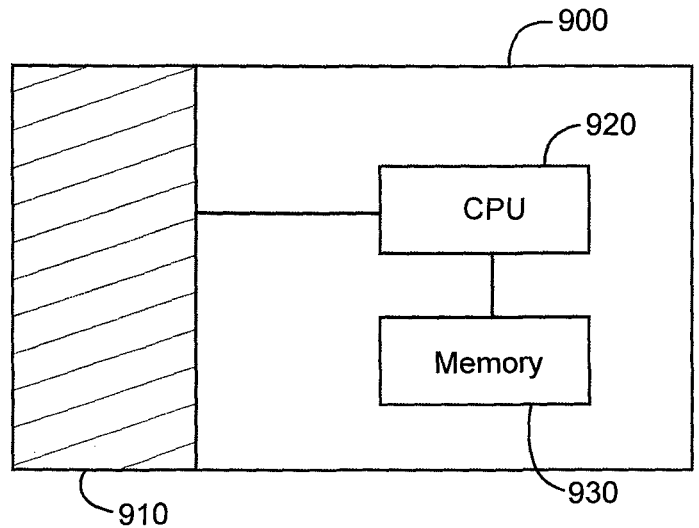
FIG. 21 is a schematic diagram of a cache server according to an exemplary embodiment.

FIG. 21 is a schematic diagram of a cache server 900 according to an exemplary embodiment. The cache server 900 may operate similar to the servers 495, 622, 722, and 822 described above. The cache server 900 includes a communication interface 910, a processing unit 920 and a memory 930. The communication interface 910 is configured to enable communication with a client device (e.g., 460, 630, 730, or 830) that submits a request for a delivery of content. The memory 930 is configured to temporarily store the content specified in the request. The processing unit 920 is configured to send a query to a network module as to whether to proceed with delivering the content depending on a network load. If the response to the query is positive, the processing unit 920 controls the communication interface 910 to send the content stored in the memory 930 to the client device. If the response to the query is negative, the processing unit 920 generates a message to indicate, to the client device, that the request is deferred, controls the communication interface 910 to send this message to the client device.

Figure 22:
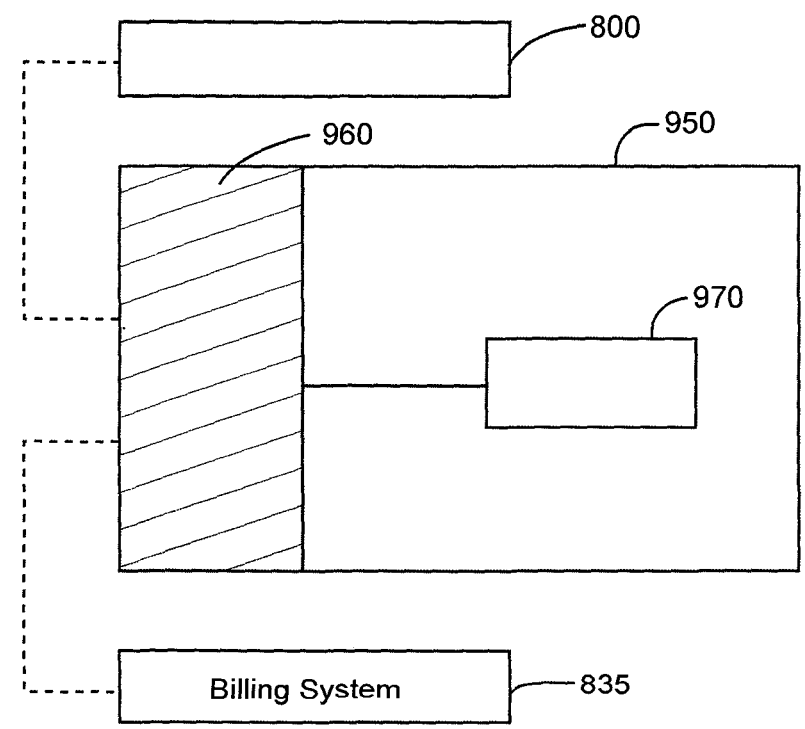
FIG. 22 is a schematic diagram of a changing device according to another exemplary embodiment.

FIG. 22 is a schematic diagram of a charging device 950 according to another exemplary embodiment. The charging device 950 includes a communication interface 960 and a processing unit 970. The communication interface 960 is configured to enable communication with a network device (e.g., 624, 724, or 824) that submits an indication that a request for a content delivery of a client device has been deferred. The processing unit 970 is configured to control charging a client account of the client a rate different from a regular rate for the content delivery when the indication has been received.

Figure 23:
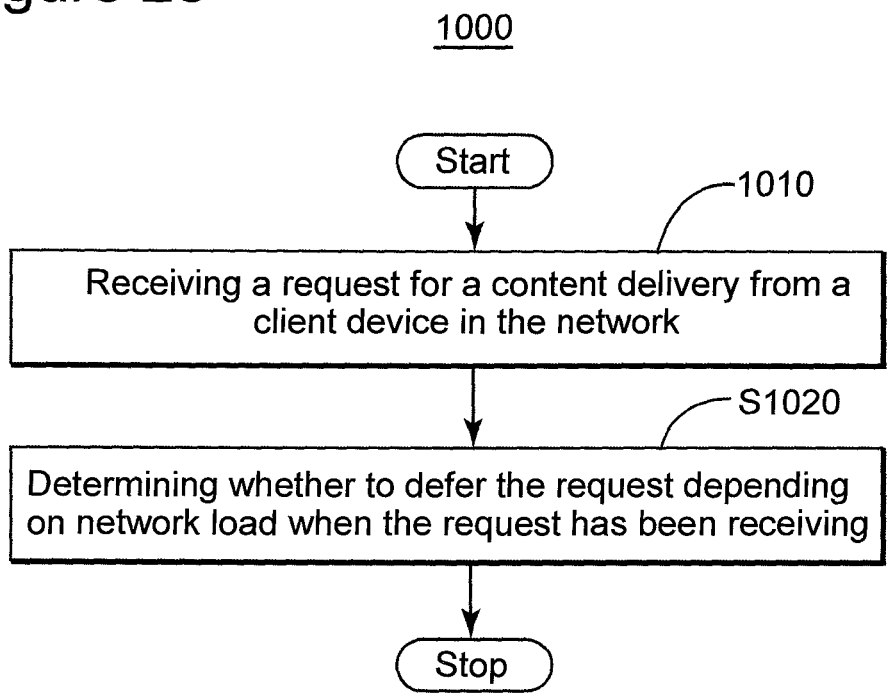
FIG. 23 is flow diagram of a method performed by a network device according to an exemplary embodiment.

FIG. 23 is flow diagram of a method 1000 performed by a network device according to an exemplary embodiment. The method 1000 includes receiving a request for a content delivery from a client device in the network, at S1010, and determining whether to defer the request depending on network load when the request has been received, at S1020.

In some embodiments, the method 1000 may further include sending a first message to the client if the request is not deferred, the first message including information enabling the content delivery, and sending a second message to the client if the request is deferred. The second message may include a time value indicating, to the client, when to resubmit the client request.

The method 1000 may further include comparing a time when the request has been received with daily network load data including peak hours and off-peak hours, and deferring the request if the time corresponds to the peak hours. The method 1000 may also include determining the network load based on information extracted from a network load database depending on a time when the request has been received.

In some embodiments the method 1000 may also include generating a billing report reflecting that the request has been deferred.

The exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories. According to one embodiment, computer readable storage medium such as the memory 430 in FIG. 8 stores executable codes which, when executed on a network device including a communication interface and a processing unit, make the network device to perform the method 1000.

The disclosed exemplary embodiments provide network devices and methods to defer delivery of non-time sensitive content when the network usage is high. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A domain name server, comprising:
   a communication interface of the domain name server is communicatively coupled with a user equipment so as to receive a request for a content delivery from the user equipment;
   a memory of the domain name server stores pairs of domain names and Internet Protocol (IP) addresses; and
   a processor of the domain name server is configured to determine whether to defer the request depending on a network load at a time when the request has been received,
   wherein if the processor has determined that the request is not deferred, the processor generates and sends a first message to the user equipment via the communication interface, to enable the content delivery,
   wherein if the processor has determined that the request is deferred, the processor generates and sends a second message to the user equipment via the communication interface,
   wherein the request for the content delivery includes a domain name of a server storing desired content, the first message includes an IP address corresponding to the domain name of the server storing the desired content, and the second message is an HTTP message that does not include the IP address corresponding to the domain name of the server storing the desired content.

2. The domain name server of claim 1, wherein the network load is inferred by comparing the time when the request has been received with daily network load data including peak hours and off-peak hours, wherein if the time when the request has been received corresponds to the peak hours, the processor defers the request.

3. The domain name server of claim 1, wherein the network load is determined based on information extracted from a network load database depending on a time when the request has been received.

4. The domain name server of claim 3, wherein the network load database is a historical database storing data related to past network load.

5. The domain name server of claim 3, wherein the network load database is a near real-time database fed with current network load information by a module configured to perform network traffic analysis.

6. The domain name server of claim 3, wherein the network load database is stored in another network device, and the network device further comprises:
   a network load database interface configured to enable communication with another network device to enable extracting the information from the network load database.

7. The domain name server of claim 1, wherein the network load is determined based on latest network load information received from a module configured to perform network traffic analysis, at a time when the request has been received.

8. The domain name server of claim 1, wherein the communication interface is further configured to communicate with a smart pipe controller within a mobile cloud accelerator to determine whether the request is deferred.

9. The domain name server of claim 1, wherein the communication interface is coupled to a smart pipe controller, which assess the network load at the time when the request is received.

10. The domain name server of claim 1, wherein the network load is based on a throughput volume of a cell in which the user equipment is located.

11. A cache server in a mobile network, comprising:
a first communication interface of the cache server is coupled with a wireless client device that submits a request for a delivery of content, wherein the request for content delivery is an HTTP GET;
a second communication interface of the cache server is coupled with a smart pipe controller;
a memory of the cache server is configured to store a content specified in the request; and
a processor of the cache server is configured to send a query to the smart pipe controller via the second communication interface as to whether to proceed with delivering the content depending on a network load and to receive a response from the smart pipe controller via the second communication interface,
wherein if the response to the query is positive, the processor sends the content stored in the memory to the wireless client device via the first communication interface, and
wherein if the response to the query is negative, the processor generates a message to indicate, to the wireless client device, that the request is deferred, and sends the message to the client device via the first communication interface, wherein the message indicating that the request is deferred is an HTTP 503 that includes a time value when the wireless client device can send another request for delivery of the content,
wherein the cache server is a mobile edge server.

12. The cache server of claim 11, wherein the time value included in the second message is an absolute time value or a time interval after the time when the request has been received at which to resubmit the request.

13. The cache server of claim 11, wherein the network load is based on a throughput volume of a cell in which the wireless client device is located.

14. A method performed by a network device, the method comprising:
receiving a request for a content delivery from a wireless client device in the network, wherein the request for content delivery is an HTTP GET;
sending a query to a smart pipe controller as to whether to proceed with delivering the content depending on a network load;
receiving a response from the smart pipe controller as to whether to proceed with delivering the content depending on the network load;
determining whether to defer the request depending on the response received from the smart pipe controller;
sending a first message to the wireless client device if the request is not deferred, wherein the first message includes the content; and
sending a second message to the client if the request is deferred, wherein the second message is an HTTP 503 that includes a time value when the wireless client device can send another request for delivery of the content,
wherein the network device is a mobile edge server operating as a cache server.

15. The method of claim 14, further comprising:
comparing a time when the request has been received with daily network load data including peak hours and off-peak hours; and
deferring the request if the time corresponds to the peak hours.

16. The method of claim 14, further comprising:
determining the network load based on information extracted from a network load database depending on a time when the request has been received.

17. The method of claim 14, wherein the network load is based on a throughput volume of a cell in which the wireless client device is located.

18. A non-transitory computer readable storage medium storing executable codes which, when executed on a network device including a communication interface and a processor, makes the network device perform a method comprising:
receiving a request for a content delivery from a wireless client device in the network, wherein the request for content delivery is an HTTP GET;
sending a query to a smart pipe controller as to whether to proceed with delivering the content depending on a network load;
receiving a response from the smart pipe controller as to whether to proceed with delivering the content depending on the network load;
determining whether to defer the request depending on the response received from the smart pipe controller;
sending a first message to the wireless client device if the request is not deferred, wherein the first message includes the content; and
sending a second message to the client if the request is deferred, wherein the second message is an HTTP 503 that includes a time value when the wireless client device can send another request for delivery of the content,
wherein the network device is a mobile edge server operating as a cache server.

19. The non-transitory computer readable storage medium of claim 18, wherein the network load is based on a throughput volume of a cell in which the wireless client device is located.

20. A method, comprising:
storing, by a domain name server, pairs of domain names and Internet Protocol (IP) addresses;
receiving, by the domain name server from a user equipment, a request for content delivery that includes a domain name of a server storing desired content;
determining, by the domain name server, whether to defer the request depending on a network load at a time when the request is received;
sending, by the domain name server when it is determined that the request is not deferred, a first message to the user equipment to enable the content delivery, wherein the first message includes an IP address corresponding to the domain name of the server storing the desired content,
sending, by the domain name server when it is determined that the request is deferred, a second message to be sent to the user equipment, wherein the second message is an HTTP 503 message that does not include the IP address corresponding to the domain name.

21. The method of claim 20, wherein the determination of whether to defer the request comprises communicating with a smart pipe controller, which assess the network load at the time when the request is received.

22. The method of claim 20, wherein the network load is based on a throughput volume of a cell in which the user equipment is located.

* * * * *